US009193442B1

(12) United States Patent
Young et al.

(10) Patent No.: US 9,193,442 B1
(45) Date of Patent: Nov. 24, 2015

(54) PREDICTABLE AND REQUIRED TIME OF ARRIVAL COMPLIANT OPTIMIZED PROFILE DESCENTS WITH FOUR DIMENSIONAL FLIGHT MANAGEMENT SYSTEM AND RELATED METHOD

(71) Applicants: Shih-Yih Young, Marion, IA (US); Kristen M. Jerome, Monticello, IA (US)

(72) Inventors: Shih-Yih Young, Marion, IA (US); Kristen M. Jerome, Monticello, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/283,683

(22) Filed: May 21, 2014

(51) Int. Cl.
*G06F 7/00* (2006.01)
*B64C 19/00* (2006.01)
*G08G 5/00* (2006.01)

(52) U.S. Cl.
CPC ............... *B64C 19/00* (2013.01); *G08G 5/003* (2013.01)

(58) Field of Classification Search
CPC ... G08G 5/0013; G08G 5/0043; G08G 5/025; Y02T 50/84
USPC .......... 701/4, 120, 3, 11, 26, 528; 714/26, 46; 244/175, 195
See application file for complete search history.

(56) References Cited

U.S. PATENT DOCUMENTS

| | | | | |
|---|---|---|---|---|
| 5,070,458 | A * | 12/1991 | Gilmore et al. | 701/14 |
| 7,302,318 | B2 * | 11/2007 | Gerrity et al. | 701/16 |
| 8,060,295 | B2 * | 11/2011 | Estkowski et al. | 701/120 |
| 8,676,403 | B2 * | 3/2014 | Garrido-Lopez et al. | 701/3 |
| 2006/0253232 | A1 * | 11/2006 | Gerrity et al. | 701/16 |
| 2009/0125221 | A1 * | 5/2009 | Estkowski et al. | 701/120 |
| 2010/0241345 | A1 * | 9/2010 | Cornell et al. | 701/120 |
| 2010/0282916 | A1 * | 11/2010 | Garrido-Lopez et al. | 244/175 |
| 2012/0053760 | A1 * | 3/2012 | Burnside et al. | 701/3 |
| 2014/0148979 | A1 * | 5/2014 | De Prins et al. | 701/3 |

OTHER PUBLICATIONS

Young, S.Y., Jerome, K. "Optimal Profile Descent with 4-D Trajectory," Proceedings of the 2013 Integrated Communications Navigation and Surveillance (ICNS) Conference. Apr. 2013. Herndon, Virginia.

Tong, Kwok-On, et al. "Descent Profile Options for Continuous Descent Arrival Procedures within 3D Path Concept," Proceedings of 26th Digital Avionics Systems Conference. Oct. 2007. pp. 3.A.3-1-3.A.3-11.

RTCA Paper No. 040-12/SC227-010 (Draft RTCA DO-236C). Minimum Aviation System Performance Standards: Required Navigation Performance for Area Navigation. Jul. 2013.

Saarlas, Maido. Aircraft Performance. 2007. Chapters 3 and 8. John Wiley & Sons. New Jersey.

(Continued)

*Primary Examiner* — McDieunel Marc
(74) *Attorney, Agent, or Firm* — Angel N. Gerdzhikov; Donna P. Suchy; Daniel M. Barbieri

(57) ABSTRACT

A method and related system may construct predictable 4-D flight profiles for fuel-efficient Optimized Profile Descents (OPD) in compliance with a Required Time of Arrival (RTA) constraint at a metering waypoint. The method may determine a feasible RTA window at the 95% confidence level enabling pilot awareness to accept or reject the RTA clearance. These methods may eliminate path unpredictability while retaining OPD benefits using constant flight path angle segments during descent. Thus, the vertical descent profile is clearly defined and, therefore, predictable to both pilots and air traffic control.

23 Claims, 16 Drawing Sheets

(56) References Cited

OTHER PUBLICATIONS

Rutowski, Edward S. "Energy Approach to the General Aircraft Performance Problem." Mar. 1954. pp. 187-195. vol. 21, No. 3. Journal of the Aeronautic Sciences (Institute of the Aeronautical Sciences).

Stell, Laurel. "Prediction of Top of Descent Location for Idle-thrust Descents," Proceedings of Ninth USA/Europe Air Traffic Management Research and Development Seminar. Jun. 2011. ATM2011. Berlin, Germany.

Stell, Laurel. "Flight Management System Execution of Idle-thrust Descents in Operations." Proceedings of 30th Digital Avionics Systems Conference. Oct. 2011. Seattle, Washington.

Balakrishma, Mahesh, et al. "Seattle Required Time-of-Arrival Flight Trials," Proceedings of 30th Digital Avionics Systems Conference. Oct. 16-20, 2011. pp. 2D4-1-2D4-10. Seattle, Washington.

\* cited by examiner

PREDICTABLE AND REQUIRED TIME OF ARRIVAL COMPLIANT OPTIMIZED PROFILE DESCENTS WITH FOUR DIMENSIONAL FLIGHT MANAGEMENT SYSTEM AND RELATED METHOD

FIELD OF THE INVENTIVE CONCEPTS

The present invention relates generally to compliance with air traffic control requirements while optimizing a fuel efficient descent profile of an aircraft. More particularly, but not by way of limitation, embodiments of the present invention relate to a system and method for a predictable and required time of arrival (RTA) compliant optimized profile descent generation within a four dimensional flight management system.

BACKGROUND

Optimized Profile Descents (OPDs) or Continuous Descent Approaches may use idle or near-idle thrust during descents to reduce fuel consumption, engine noise and carbon emissions. With Optimized Profile Descents, aircraft may descend continuously from cruise altitude to the bottom of descent or to an initial approach fix without level path segments. However, to utilize OPDs without reducing the traffic throughput around an airport, Air Traffic Control may impose an RTA at a metering waypoint to safely merge incoming traffic. If idle thrust is used during the OPD, the descent profile is a function of not only aircraft speed, aircraft weight, wind and temperature, but also aircraft platforms and engine types. Therefore, the idle descent profile may vary from one aircraft to another and from one flight to another flight.

One highly efficient performance characteristic of a transport category aircraft may include a constant cruise phase followed by an idle-power descent from cruise altitude to the landing. This idle-power descent may include a constant Mach descent phase, a constant calibrated airspeed (CAS) descent phase, a deceleration from constant CAS to a statutory speed (e.g., 250 knots), a 250 knot descent phase, a deceleration to final approach speed, and a landing. One goal for maximum efficiency may include an idle power descent from a Top of Descent (TOD) point (often 40,000 feet mean sea level (MSL)) to 1000 feet above ground level (AGL) where engines must normally be spooled up for landing and possible missed approach. This most efficient idle-power descent, however, is often unavailable due to a variety of path constraints including additional traffic in the terminal area.

During aircraft transition from en route to landing, air traffic controllers may frequently issue instructions (or clearances) to change aircraft trajectories based on this additional traffic. These instructions may include temporary altitude assignments, increasing or decreasing speed adjustments, and temporary off-course lateral vectoring. These instructions enable traffic controllers to manage air traffic flow while ensuring proper aircraft separation and flight safety. However, these controller instructions cause inefficiencies in performance requiring aircraft to execute suboptimal maneuvers, such as stair-step descents. A stair-step descent burns significantly more fuel and generates more carbon emissions and engine noise than an uninterrupted OPD because OPDs use idle or near-idle thrust to execute a smooth speed-and-altitude profile during the descent phase of flight, while complying with multiple path constraints.

To enable OPDs without reducing traffic capacity throughout the Terminal Radar Approach Control (TRACON) area, a RTA constraint is usually imposed by air traffic controllers on a metering waypoint on the boundary of the TRACON area or on an Initial Approach Fix (IAF) to enable safe merging of air traffic. Therefore, upon receiving the RTA in-flight, the onboard Flight Management System (FMS) must be able to quickly construct the 4-dimensional (4-D) trajectory of an OPD in compliance with the assigned RTA.

A 95% confidence level may be one requirement by Air Traffic Control (ATC) to ensure each aircraft receiving a RTA is able to comply. Systems meeting the 95% confidence level may enjoy preferential treatment or exclusive use of a particular published arrival procedure.

A maximum performance OPD may be the best case scenario based on fuel economy, carbon emissions, and cost to the operator. However, the maximum performance idle descent OPD may not comply with the traffic clearance requirements of the local TRACON.

Consequently, a need exists for a system and related method combining the benefits of a maximum performance and RTA compliant OPD with the requirement for predictability by an air traffic control tasked with traffic separation.

SUMMARY

Accordingly, an embodiment of the present invention is directed to a method for generating a predictable descent path for a vehicle, comprising: receiving a preplanned lateral route including at least one metering waypoint, receiving weather information including a wind vector for at least one altitude, the at least one altitude corresponding to the preplanned lateral route, receiving a required time of arrival for the at least one metering waypoint, receiving vehicle information indicative of at least one performance parameter of the vehicle, generating an idle descent path, the idle descent path a first vertical path corresponding with the lateral path, the idle descent path based on the vehicle information and the weather information, generating a geo path, the geo path being a second vertical path corresponding with the preplanned lateral route, the geo path based on a vertical geometry from a top of descent point to at least one arrival point, the top of descent point and the arrival point corresponding with the preplanned lateral route, generating a descent speed based on a desired vehicle performance, generating a reference path based on a combination of the idle descent path and the geo path, refining the descent speed via at least one speed adjustment, the at least one speed adjustment based at least on: the required time of arrival, the desired vehicle performance, and an external disturbance, generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile, and displaying the predictable descent path to a vehicle crewmember on a display.

An additional embodiment of the present invention may include a method wherein the predictable descent path at the refined descent speed is accurate at the metering waypoint to within one of: 95% of the required time of arrival, and six seconds of the required time of arrival.

An additional embodiment of the present invention may include a method wherein the vehicle is one of: an aircraft, helicopter, a manned aerial vehicle, and an unmanned aerial vehicle and wherein the preplanned lateral route includes at least one of a flight plan, a published procedure, a noise sensitive procedure, and a standard instrument procedure.

An additional embodiment of the present invention may include a method wherein the predictable descent path at the refined descent speed further comprises a predictable climb path at a refined climb speed and wherein the weather information further comprises a plurality of wind vectors at a corresponding plurality of altitudes, the plurality of wind vectors updatable via a wireless signal.

An additional embodiment of the present invention may include a method wherein generating a reference path further comprises generating a second idle descent path and a second reference path after at least one of a disturbance and an update to the weather information and wherein the vertical geometry from a top of descent point to at least one arrival point further comprises a vertical altitude and a lateral range.

An additional embodiment of the present invention may include a method wherein generating a descent speed further comprises at least one continuous speed descent and at least one continuous deceleration descent.

An additional embodiment of the present invention may include a system for generating a predictable descent path for a vehicle, comprising: a flight management system, the flight management system including a flight management computer operably coupled with at least a non-transitory memory, an input output, a display, a route information module, an aircraft information module, and an updatable weather information module, wherein the flight management computer is configured for: receiving a preplanned lateral route from the route information module, the preplanned lateral route including at least one metering waypoint, receiving weather information via the updatable weather information module, the weather information including a wind vector for at least one altitude, the at least one altitude corresponding to the preplanned lateral route, receiving a required time of arrival for the at least one metering waypoint, receiving aircraft information via the aircraft information module, the aircraft information indicative of at least one performance parameter of the aircraft, generating an idle descent path, the idle descent path a first vertical path corresponding with the lateral path, the idle descent path based on the aircraft information and the weather information, generating a geo path, the geo path being a second vertical path corresponding with the preplanned lateral route, the geo path based on a vertical geometry from a top of descent point to at least one arrival point, the top of descent point and the arrival point corresponding with the preplanned lateral route, generating a descent speed based on a desired aircraft performance, generating a reference path based on a combination of the idle descent path and the geo path, refining the descent speed via at least one speed adjustment, the at least one speed adjustment based at least on: the required time of arrival, the desired aircraft performance, and an external disturbance, generating a predictable descent path based on the reference path, the predictable descent path corresponding with the preplanned lateral route, the predictable descent path at the refined descent speed, the predictable descent path in compliance with at least one of: the required time of arrival, the aircraft information, and a published descent profile, and displaying the predictable descent path to a pilot on the display.

An additional embodiment of the present invention may include a computer readable medium having non-transitory computer readable program code embodied therein for generating a predictable descent path for an aircraft, the computer readable program code comprising instructions which, when executed by a computer device or processor, cause the computer device to perform and direct the steps of: receiving a preplanned lateral route including at least one metering waypoint, receiving weather information including a wind vector for at least one altitude, the at least one altitude corresponding to the preplanned lateral route, receiving a required time of arrival for the at least one metering waypoint, receiving vehicle information indicative of at least one performance parameter of the vehicle, generating an idle descent path, the idle descent path a first vertical path corresponding with the lateral path, the idle descent path based on the vehicle information and the weather information, generating a geo path, the geo path being a second vertical path corresponding with the preplanned lateral route, the geo path based on a vertical geometry from a top of descent point to at least one arrival point, the top of descent point and the arrival point corresponding with the preplanned lateral route, generating a descent speed based on a desired vehicle performance, generating a reference path based on a combination of the idle descent path and the geo path, refining the descent speed via at least one speed adjustment, the at least one speed adjustment based at least on: the required time of arrival, the desired vehicle performance, and an external disturbance, generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile.

An additional embodiment of the present invention may include a method for generating a predictable descent path for a vehicle, comprising: means for receiving a preplanned lateral route including at least one metering waypoint, means for receiving weather information including a wind vector for at least one altitude, the at least one altitude corresponding to the preplanned lateral route, means for receiving a required time of arrival for the at least one metering waypoint, means for receiving vehicle information indicative of at least one performance parameter of the vehicle, means for generating an idle descent path, the idle descent path a first vertical path corresponding with the lateral path, means for generating a geo path, the geo path being a second vertical path corresponding with the preplanned lateral route, means for generating a descent speed, the descent speed based on a desired vehicle performance, means for generating a reference path based on a combination of the idle descent path and the geo path, means for refining the descent speed via at least one speed adjustment, means for generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile.

An additional embodiment of the present invention may include a method for generating descent path for a vehicle predictable within 95% of a confidence level, comprising: receiving a preplanned lateral route including at least one metering waypoint, receiving weather information including a wind vector for at least one altitude, the at least one altitude corresponding to the preplanned lateral route, receiving a required time of arrival for the at least one metering waypoint, the required time of arrival including a window of compliance, receiving vehicle information indicative of at least one performance parameter of the vehicle, generating an idle descent path, the idle descent path a first vertical path corresponding with the lateral path, the idle descent path based on the vehicle information and the weather information, generating a geo path, the geo path being a second vertical path corresponding with the preplanned lateral route, the geo path based on a vertical geometry from a top of descent point to at least one arrival point, the top of descent point and the arrival point corresponding with the preplanned lateral route, generating a feasible descent speed based on: a desired vehicle performance and the window of compliance, generating a reference path based on a combination of the idle descent path and the geo path, refining the feasible descent speed via at least one speed adjustment, the at least one speed adjustment based at least on: the required time of arrival, the desired vehicle performance, the window of compliance, and an external disturbance, the refined feasible speed accurate to within a 95% confidence level to meet the window of compliance, generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile, and displaying the predictable descent path and the refined feasible speed to a vehicle crewmember on a display.

An additional embodiment of the present invention may include a method wherein the window of compliance is plus and minus six seconds from the received required time of arrival and wherein the refined feasible speed is based at least on one of: a maximum feasible speed and a minimum feasible speed, the maximum feasible speed less than a maximum vehicle speed, the minimum feasible speed greater than a minimum vehicle speed.

It is to be understood that both the foregoing general description and the following detailed description are exemplary and explanatory only and are not necessarily restrictive of the inventive concepts disclosed and claimed herein. The accompanying drawings, which are incorporated in and constitute a part of the specification, illustrate embodiments of the present invention and together with the general description, serve to explain the principles of the present invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
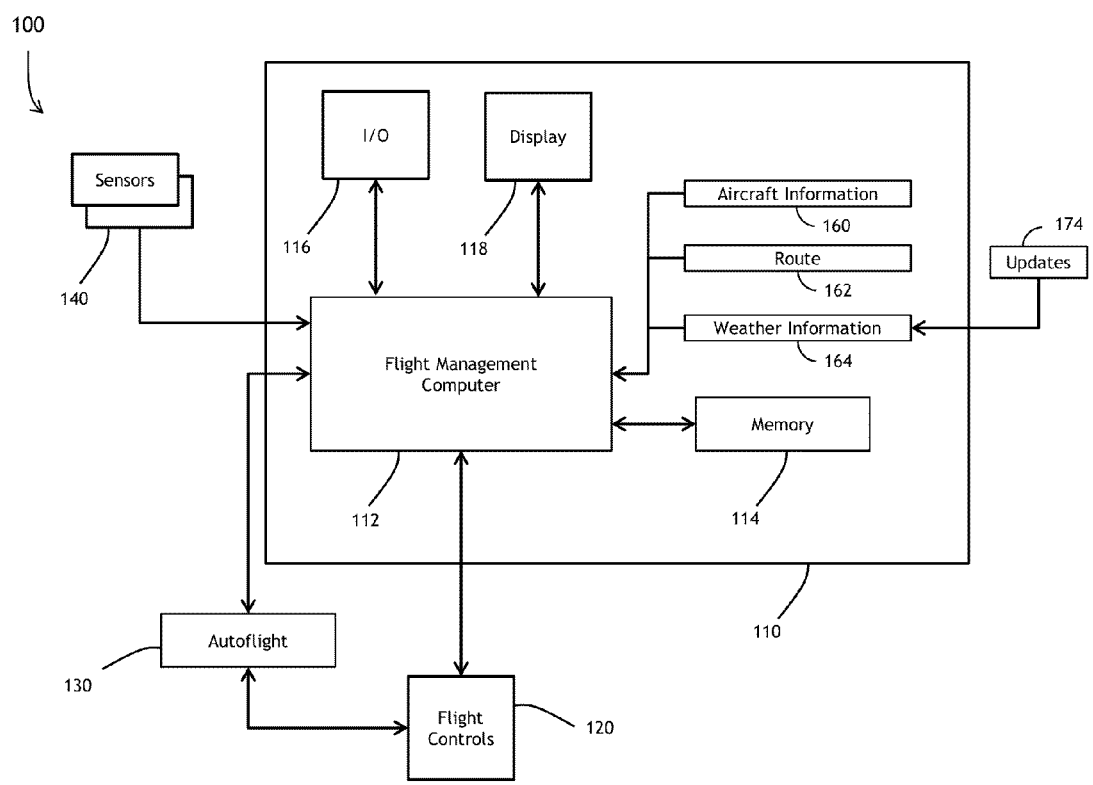
FIG. 1 is an exemplary system for predictable and RTA compliant OPD generation provided by one embodiment of the present invention.

Reference will now be made in detail to the presently preferred embodiments of the present invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

The present invention may operate in concert with a real-time auto router named Airborne E* (pronounced as E Star) that maintains the in-flight, long-range 4-D trajectory re-planning capability and was designed to meet desired automated routing requirements. Airborne E* is described in 1) U.S. Pat. No. 8,234,068B1 ('068 Patent), issued Jul. 31, 2012, filed: Jan. 15, 2009, entitled "System, Module, and Method of Constructing a Flight Path Used by an Avionics System," to Young, et. al. and 2) U.S. patent application Ser. No. 12/870,335 ('335 application) entitled "Rapid Intervisibility Determination In Resource-Constrained Computational Environments" filed on Aug. 27, 2010, by Young, et. al., and U.S. patent application Ser. No. 13/949,612 ('612 application) entitled In-Flight Generation Of RTA-Compliant Optimal Profile Descent Paths filed on Jul. 24, 2013, by Young, et. al., all of which are incorporated by reference herein in their entirety.

This and all other referenced patents and applications are incorporated herein by reference in their entirety. Furthermore, where a definition or use of a term in a reference, which is incorporated by reference is inconsistent or contrary to the definition of that term provided herein, the definition of that term provided herein applies and the definition of that term in the reference does not apply.

Embodiments of the present invention may include a system and related method capable of combining 1) fuel-saving arrival procedures; 2) predictable optimized profile descent path generation; and 3) feasible RTA window at a 95% confidence level. The system representing embodiments of the present invention may present:

1. A predictable OPD path acceptable to air traffic controllers;

2. An airborne re-planning capability after an initial generation of the predictable OPD path performed to reject external disturbances and to maintain the estimated arrival time at the metering waypoint to be within an RTA threshold; and 3. A feasible RTA window which takes into account the statistical distribution of wind speed errors and is computed at the 95% probability level, or any other desired probability level as may be specified or required by industry standards.

Embodiments of the present invention may be directed to an enhanced design able to construct predictable RTA-compliant OPD trajectories to minimize the concern of path unpredictability. System 100 may employ a design such as Optimal E* hosted within the FMS as an embedded module. System 100 may command the FMS to provide guidance commands to the automatic flight control system to ensure on time arrival at the metering waypoint.

Embodiments of the present invention may be implemented in software stored in the memory 114 operatively coupled with the onboard flight management computer 112.

Embodiments of the present invention may include an enhanced algorithm to determine a feasible RTA window at the 95% confidence level. Upon receiving an RTA constraint from air traffic controllers, the pilots determine whether the received RTA is feasible with a 95% confidence level. Therefore, the FMS computes a feasible RTA window at the 95% probability level to enable pilots to accept or reject the received RTA. This feasible RTA window indicates the earliest and latest arrival times at the metering waypoint with a 95% probability level that may be achieved by the aircraft. If the RTA is within the feasible RTA window, pilots may accept the RTA into FMS. If the RTA is outside the feasible RTA window, pilots may maintain awareness of the feasibility of the RTA compliance and inform the ATC controller.

Referring to FIG. 1, an exemplary system for predictable and RTA compliant OPD generation provided by one embodiment of the present invention is shown. System 100 may include a Flight Management System (FMS) 110 comprising a Flight Management Computer (FMC) 112. FMC 112 may be directly and operationally connected in communication with a plurality of aircraft systems including flight controls 120, auto flight systems 130, and aircraft sensors 140. In addition, FMC 112 may be directly and operationally connected in communication with an Input Output system 116, a display 118, a memory 114, aircraft information 160, route information 162, and updatable 174 weather information 164.

Figure 2:
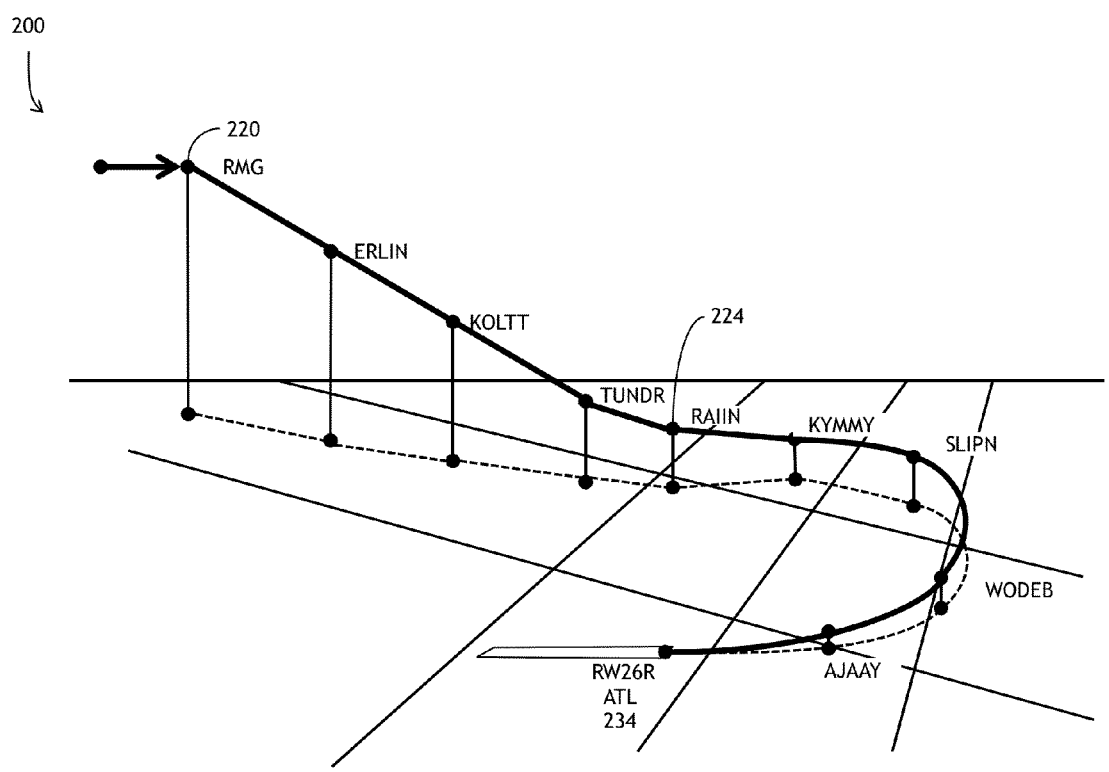
FIG. 2 is an exemplary arrival for which embodiments of the present invention may provide a predictable and RTA compliant OPD.

Referring to FIG. 2, an exemplary arrival for which embodiments of the present invention may provide a predictable and RTA compliant OPD is shown. A typical profile for an OPD into Atlanta International Airport (ATL) 234 from the West may include a published descent profile 200. In this exemplary descent profile 200 the descent may begin at a TOD at RMG 220, traversing multiple points in a lateral and vertical profile published to ensure compliance by each arriving aircraft. A terminal point 224 RAIIN may be one point at which ATC may require the aircraft to arrive at an RTA. As each aircraft may be assigned similar speed, the common lateral routing with individual RTAs may allow safe separation between arriving aircraft.

Figure 3:
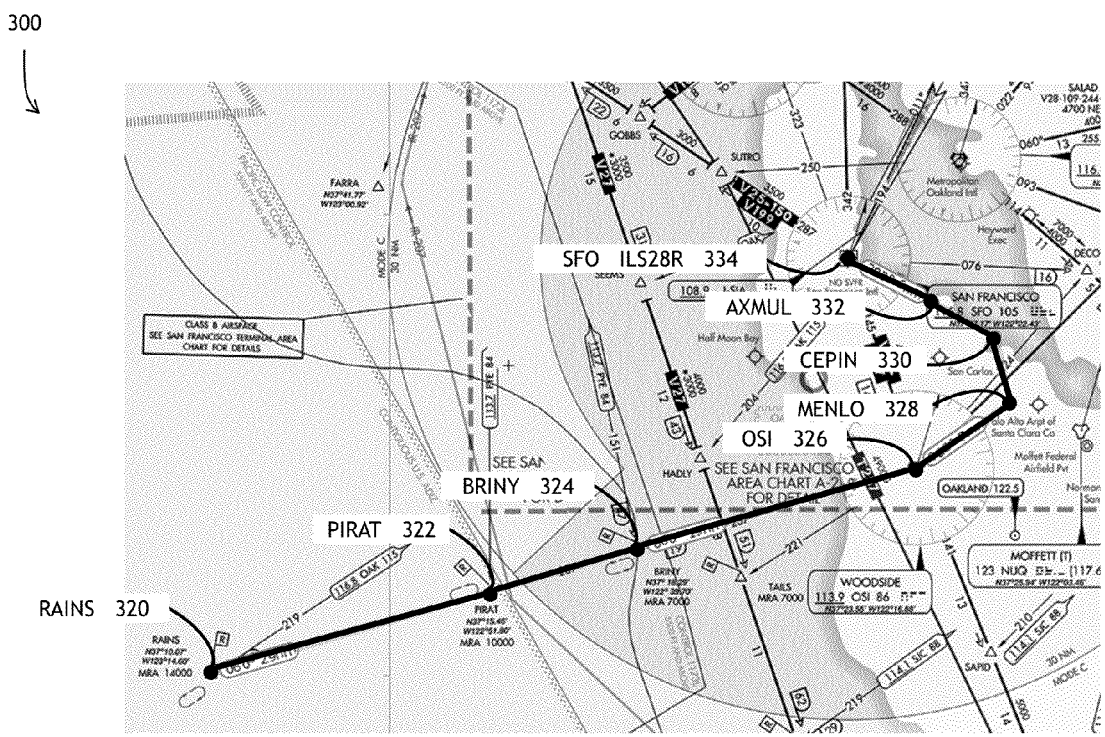
FIG. 3 is an overhead view of an exemplary arrival for which embodiments of the present invention may provide a predictable and RTA compliant OPD.

Referring to FIG. 3, an overhead view of an exemplary arrival for which embodiments of the present invention may provide a predictable and RTA compliant OPD is shown. An arrival into San Francisco International Airport (SFO) 334 from the West may include an initial point with an RTA assigned at BRINY 324, each arriving aircraft may flow through the same points on the arrival including BRINY 324 to ensure lateral separation during the terminal phase. Once each aircraft passes BRINY 324, ATC may require a similar speed for each aircraft to fly through the remaining points OSI 326, MENLO 328, CEPIN 330, and AXMUL 332 of the arrival to arrive at the SFO ILS28R 334 with a minimum of 5 miles of lateral (nose to tail) separation.

Figure 4:
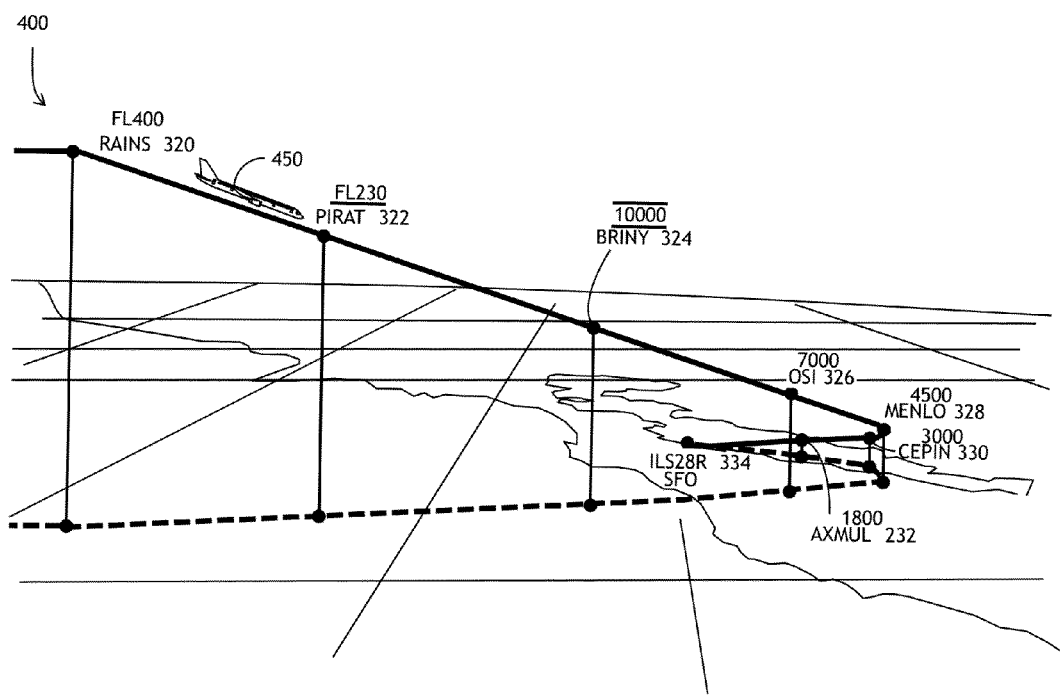
FIG. 4 is a side view of an exemplary arrival for which embodiments of the present invention may provide a predictable and RTA compliant OPD.

Referring to FIG. 4, a side view of an exemplary arrival for which embodiments of the present invention may provide a predictable and RTA compliant OPD is shown. This similar arrival into SFO 334 from the West as seen from a side view may include published altitude requirements within which the arrival aircraft 450 must comply. Published arrival altitudes may include a minimum altitude, for example, at or above FL230 (23,000 ft MSL) at PIRAT 322 and a required or "hard" altitude, for example, at BRINY at 10,000 ft MSL. On occasion, a published arrival procedure may include a published speed requirement at a particular fix. For example, "BRINY at 10000 at 250 KTS" or "BRINY at 10000 expect 250 KTS" may be common speed requirements for aircraft 450 arriving through the BRINY 324 intersection. Each additional variable requires a change in the TOD point to ensure minimum fuel used during the descent procedure.

Equations of Motion

The equations of motion used to determine the vertical flight profile are derived from the Energy Method and are summarized below.

$$\frac{dh}{dt} = \frac{\frac{(T-D)V_T}{W}}{\left[1 + \frac{V_T}{g}\frac{dV_T}{dh}\right]} \quad (1)$$

Where h is the altitude, T is the thrust, D is the drag, W is the aircraft gross weight, t is the time, g is the gravity, and $V_T$ is the true air speed. The rate of descent relative to the wind may also be expressed as follows, assuming a constant flight path angle γ during one small numerical integration interval.

$$\gamma \cong \frac{1}{V_T}\frac{dh}{dt} = \frac{(T-D)}{W\left[1 + \frac{V_T}{g}\frac{dV_T}{dh}\right]} \quad (3)$$

Since the flight path angle is relatively small during descent, Eqs. (1) and (2) may be combined as follows:

$$\frac{dh}{dt} = V_T \sin\gamma \quad (2)$$

Figure 5:
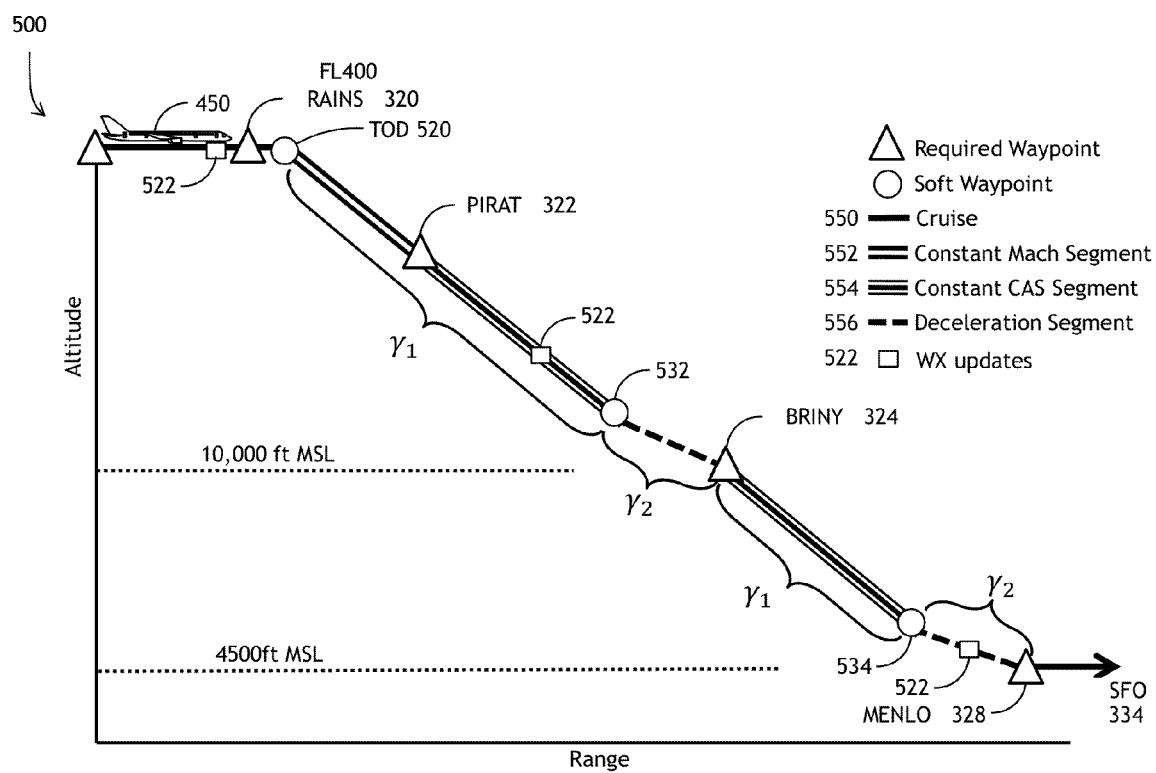
FIG. 5 is a diagram of an exemplary reference path in accordance with one embodiment of the present invention.

Referring to FIG. 5, a diagram of an exemplary reference path in accordance with one embodiment of the present invention is shown. In this example, aircraft 450 is assigned the arrival into SFO 334 via RAINS 320 and BRINY 324. On the arrival, required waypoints such as PIRAT 322 and soft waypoints 532 may determine desired performance characteristics of the arrival aircraft 450.

For example, a required waypoint such as MENLO may include lateral points/fixes over which the aircraft 450 must fly to comply with the arrival. In addition, the required waypoints may include a published speed and altitude with which the aircraft 450 must comply.

Conversely, system 100 may produce soft waypoints 532 produced internally to enable the aircraft 450 to comply with the required waypoints. For example, should aircraft 450 be required to comply with the speeds and altitudes published on the arrival, system 100 may generate a TOD 520 to ensure the aircraft 450 is able to make the assigned restrictions. Additionally, should BRINY be published at 10,000 ft MSL and 250 kts, system 100 may generate a soft waypoint 532 just prior to BRINY 324 to properly configure the aircraft to sufficiently slow to make the BRINY restriction.

System 100 may update 174 weather information 164 periodically as indicated by update points 522. As weather information 164 is updated, system 100 may recalculate the reference path to more accurately comply with the arrival.

Weather updates 174 which occur after the aircraft 450 has passed the original TOD 520 may require additional external input (e.g., drag) for aircraft 450 to comply with the published arrival. For example, should a weather update 174 produce a situation where performance is better than expected, speed brakes may be required to ensure path compliance. Conversely, should a weather update 174 produce a situation where performance is less than anticipated, power may be required to maintain the path compliance.

System 100 Design

The trajectory for a straight-in OPD procedure may use two types of speed segments:

1. Constant speed segments 552 and 554 (i.e., constant Calibrated Air Speed (CAS) 552 and constant Mach Segment 554); and
2. a constant deceleration segment 556.

System 100 may use a layered approach to generate a predictable RTA-compliant OPD trajectory that also may use the two types of speed segments. One layer may approximate an idle descent path with path segments that have constant flight path angles to create a reference path. An additional layer may use a Deterministic Genetic Algorithm (DGA)-based method to refine the reference path.

First Layer: Reference Path

System 100 may use an iterated method using a pair of backward and forward sweeps to determine an idle descent path. System 100 may create a reference path by approximating this idle descent path with path segments that have constant flight path angles.

As shown in FIG. 5, system 100 may define two deceleration segments 556 by path segments with the same flight path angle $\gamma_2$. System 100 may use path segments with the same flight path angle $\gamma_1$ to define constant speed segments. Thus, the number of generated flight path angles for the reference descent path may be equal to the number of speed segment types (here, 2). System 100 may select the shallowest flight path angle of all constant speed segments of the idle descent path as $\gamma_1$, and may select the shallowest flight path angle of all deceleration segments of the path as $\gamma_2$.

System 100 may construct the reference path by starting from the final waypoint of the descent path (here, MENLO 328) and working backward to the cruise altitude (here, FL400). System 100 determines the TOD 520 location as the interception point of the cruise altitude and the descent path. System 100 may determine the ground location of the waypoint preceding the final waypoint based on the flight path angle of the path segment and the altitude difference between these two waypoints, as shown below.

$$\Delta S = \frac{\Delta h}{\tan \gamma} \quad (4)$$

Where $\Delta S$ is the ground track distance, $\Delta h$ is the altitude difference and $\gamma$ is the flight path angle of the path segment connecting these two successive waypoints.

If the time difference between RTA and the Estimated Time of Arrival (ETA) of the reference path at the published point (BRINY) is within a required time threshold and the reference path complies with all other constraints, system 100 may identify the reference path as the final path. Otherwise, system 100 may further refine the reference path in its second layer.

Second Layer: Path Refinement

System 100 may employ a Deterministic Genetic Algorithm (DGA) used to refine the infeasible reference path and ensure the final trajectory is feasible. The DGA algorithm may remove the randomness aspect by using the identical initial seed with the random number generator when constructing the OPD path. Therefore, with the same input data, system 100 may generate identical results.

Depending on whether path candidate G is feasible or infeasible (i.e., at least one constraint is violated), the fitness value F of a path candidate G is defined as $$F(G) = \begin{cases} \frac{1}{\text{Path\_Cost}(G)}, & G \text{ is Feasable} \\ \frac{1}{C_{max} + NPC(G)}, & G \text{ is infeasable} \end{cases} \quad (5)$$

Where Path_Cost(G) is the accumulated fuel consumption for path candidate G;

$C_{max}$ is the maximum path cost for the worst feasible path; and

NPC(G) is the normalized penalty cost for violating constraints.

The DGA algorithm finds the path candidate with the maximum value of F.

Flight Path Constraints

In addition to the 4 flight path constraints 1) RTA, 2) Flight Path Angle, 3) Speed, and 4) Maximum and Minimum Speed, system 100 may consider the use of speed brakes as a $5^{th}$ flight constraint.

Pilots may often be reluctant to deploy speed brakes due to noise, ride discomfort, and an indication of a less than optimum descent profile. In addition, speed brakes may need to be manually deployed by pilots since automatic speed brake deployment is not available on some aircraft. Manual deployment of speed brakes may cause the violation of RTA due to the time delay for pilots to deploy speed brakes. Therefore, system 100 may be configured to consider whether the use of speed brakes is allowed. If the use of speed brakes is not allowed, system 100 may generate a speed profile that indicates a desired prohibition of the deployment of speed brakes.

The normalized penalty cost $NP_{SB}$ for this $5^{th}$ constraint (speed brakes) may be defined as:

$$NP_{SB} = \begin{cases} \frac{F_{SB}}{100}, & SB \text{ not allowed} \\ \frac{F_{SB}}{100}, & F_{SB} \geq F_{SB}^{max} \text{ and } SB \text{ allowed} \\ 0, & F_{SB} > F_{SB}^{max} \text{ and } SB \text{ allowed} \end{cases} \quad (6)$$

Where $F_{SB}$ is the maximum speed brake force that is greater than a user specified threshold in lbs and $F_{SB}^{max}$ is the maximum available speed brake force for this aircraft in lbs.

The normalization factor of 100 in Eq. (6) is chosen to make the penalty of speed brake violation to be slightly smaller than the penalty of RTA violation.

Genetic Operators

System 100 design may include 3 genetic operators to adjust the path candidates to be compliant with flight path constraints. These genetic operators are presented below. Random selection in the design means the selection is performed with a uniform probability, if no specific probability distribution function is defined.

Descent Speed Mutator:

The descent speed mutator adjusts the cruise Mach speed and/or descent CAS speed based on the difference between the ETA of path candidate G and RTA.

Figure 6A:
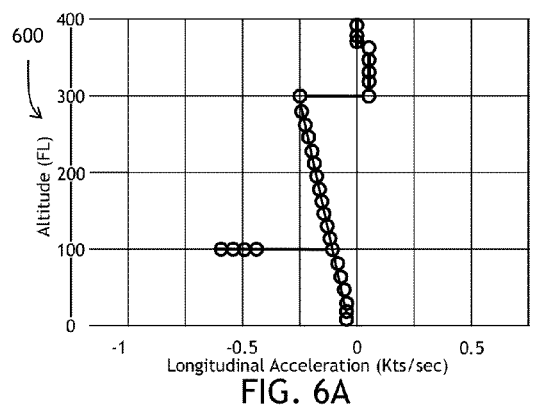
FIGS. 6A-6D are graphs of descent parameters for a GEO path in accordance with one embodiment of the present invention.
Figure 6B:
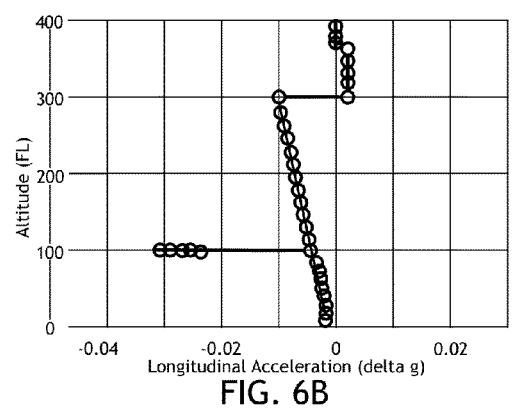

Referring to FIGS. 6A-6D, graphs of descent parameters for a GEO path in accordance with one embodiment of the present invention are shown. FIGS. 6A and 6B show graphs of longitudinal acceleration in kts per second (FIG. 6A) and delta g (FIG. 6B) over altitude in feet in a GEO path OPD. As indicated, two deceleration points may be indicated where system 100 decelerates the aircraft 450. A first deceleration may be indicated at FL 300 where a constant Mach descent is transitioned to a constant CAS descent. A second deceleration may be indicated at a statutory descent altitude of 10,000 ft MSL (FL100) where all aircraft must slow to 250 kts to comply with the statutory requirement.

Figure 6C:
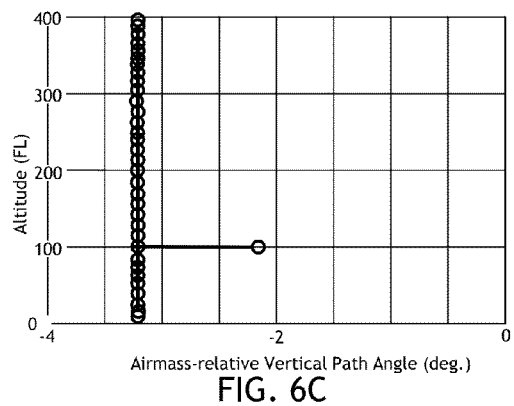

FIG. 6C indicated a near constant airmass relative vertical path angle during the GEO descent. The indicated −3.2 degrees may be interrupted with a momentary −2.1 degree reading as the aircraft again slows at the statutory altitude (here FL100 or 10,000 ft MSL). As shown in FIG. 6C, there are 2 flight path angles for this Geo Descent Path since there are 2 descent speed profiles (i.e., constant speed and constant deceleration).

Figure 6D:
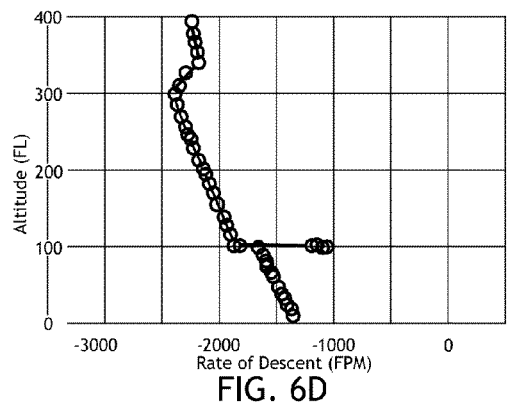

FIG. 6D indicates the rate of descent over altitude for the GEO descent. The rate may find transitions at both the 30,000 ft MSL altitude and the 10,000 ft MSL altitude during each of the described transitions.

Define:

$$\Delta T = ETA - RTA$$

$$ind_{Mach} =$$

$$\Delta T = ETA - RTA$$

$$ind_{Mach} = \left\{ \begin{array}{l} \alpha + 1, |\Delta T| > Dev\_TD \\ \alpha, |\Delta T| \leq Dev\_TD \end{array}, \alpha \in \mathbb{Z} : 1 \leq \alpha \leq 3 \right\}$$

$$ind_{CAS} =$$

$$ind_{CAS} = \left\{ \begin{array}{l} \alpha_1 + 1, |\Delta T| > Dev\_TD \\ \alpha, |\Delta T| \geq Dev\_TD \end{array}, \alpha_1 \in \mathbb{Z} : 1 \leq \alpha_1 \leq 3 \right\}$$

$$Selection = \left\{ \begin{array}{l} MACH_{Only} = 1 \\ CAS_{Only} = 2 \\ Both = 3 \end{array} \right\}$$

$MACH_{dev}$=[0.01 0.01 0.01 0.02]
$CAS_{dev}$=[1 3 6 10] knots
$MAC_{big\_dev}$=[0.01 0.01 0.02 0.03]
$CAS_{big\_dev}$=[1 4 8 12] knots
Where: Dev_TD is the threshold to determine if a larger or smaller speed deviation is preferred to meet RTA;

$ind_{MACH}$=and $ind_{CAS}$ are randomly selected indices that are used to extract the correct deviations from $MACH_{dev}$ and $CAS_{dev}$ arrays, respectively, or from $MACH_{big\_dev}$ and $CAS_{big\_dev}$ arrays;

$\alpha$ and $\alpha_1$ are integers and are randomly selected from the specified range of 1 to 3;

Selection is randomly determined to indicate which type of speed deviation may be applied (Mach only, CAS only or both Mach and CAS). However, Selection may be set to Both when |ΔT|>Dev_TD_Both which is a user specified threshold (e.g., 120 seconds);

$MACH_{dev}$ and $MACH_{big\_dev}$ are the arrays containing the possible speed deviations to adjust the cruise Mach speed; and $CAS_{dev}$ and $CAS_{big\_dev}$ are the arrays containing the possible deviations to adjust the current descent CAS speed.

The following pseudo code updates the cruise Mach and descent CAS for this mutator.

If |ΔT|>Dev_TD_Both then

Mach_Inc=$Mach_{big\_dev}$

CAS_Inc=$CAS_{big\_dev}$

Else

Mach_Inc=$Mach_{dev}$

CAS_Inc=$CAS_{dev}$

If ΔT>0 then

Ω=1

Else

Ω=−1

If Selection=Mach_Only $M'_{cruise}=M_{cruise}+\Omega*Mach\_Inc(ind_{Mach})$

Where $M'_{cruise}$ is the updated cruise Mach speed and Mach_Inc($ind_{Mach}$) is the selected Mach deviation.

Else if Selection=CAS_Only $CAS'_{descent}=CAS_{descent}+\Omega*CAS\_Inc(ind_{CAS})$ Where $CAS'_{descent}$ is the updated descent CAS and $CAS_{descent}$ is the selected CAS deviation.

Else if Selection=Both $M'_{cruise}=M_{cruise}+\Omega*Mach\_Inc(ind_{Mach})$ $CAS'_{descent}=CAS_{descent}+\Omega*CAS\_Inc(ind_{CAS})$ If $M'_{cruise}>M_{max}$, then $M'_{cruise}=M_{max}$
Else if $M_{cruise}<M_{min}$, then $M'_{cruise}=M_{min}$
If $CAS'_{descent}>CAS_{max}$, then $CAS'_{descent}=CAS_{max}$
If $CAS'_{descent}<CAS_{min}$, then $CAS'_{descent}=CAS_{min}$
Where $M_{max}$ is the maximum Mach, $M_{min}$ is the minimum Mach, $CAS_{max}$ is the maximum descent CAS, and $CAS_{min}$ is the minimum descent CAS.

After the mutation, systems herein may re-compute the speed profile of the select path candidate with the updated cruise Mach and descent CAS by using the E* forward sweep method discussed below.

Figure 7:
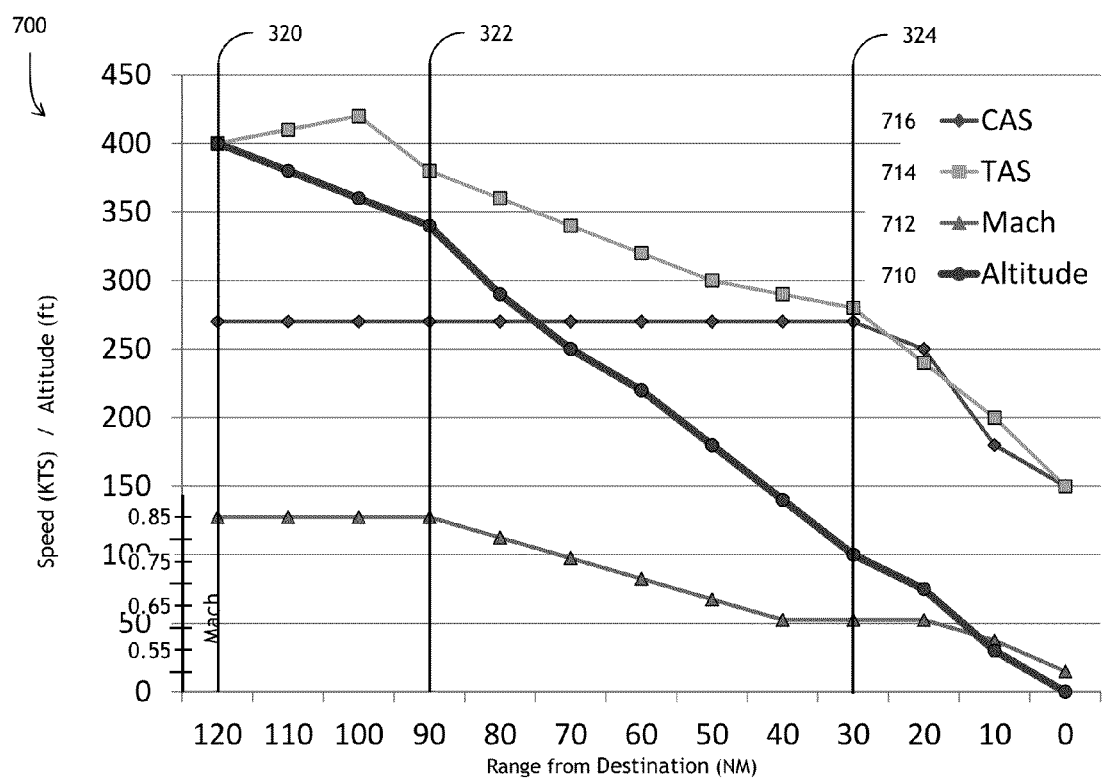
FIG. 7 is a graph of speed parameters for a GEO path in accordance with one embodiment of the present invention.

Referring to FIG. 7, a graph of speed parameters for a GEO path in accordance with one embodiment of the present invention is shown. As range from destination decreases, each of the graphed parameters may also decrease. Altitude 710 may approximate the GEO path as indicated in FIG. 5. True airspeed (TAS) 714 may initially increase followed by a near constant decrease to BRINY 324 where each airspeed decreased to comply with the statutory requirement. Calibrated airspeed (CAS) 716 may remain constant near 260 kts CAS to BRINY 324 where CAS 716 may decrease. Mach 712 may remain constant from the TOD 520 at RAINS 320 until the Mach/CAS crossover transition point at PIRAT 322. After the cross-over, Mach 712 may decrease with decreasing altitude and airspeed.

Speed Cross-over Mutator:

The purpose of this mutator is to inject a big speed change into the select path candidate G to ensure the diversity of the population and avoid the quick convergence to a local minimum.

Define:

$$ind_{mach} = \alpha_2, \alpha_2 \in \mathbb{Z} : 1 \le \alpha_2 < 2$$

$$ind_{cas} = \alpha_3, \alpha_3 \in \mathbb{Z} : 1 \le \alpha_3 \le 2$$

$$selection = \begin{Bmatrix} MACH_{Only} = 1 \\ CAS_{Only} = 2 \\ Both = 3 \end{Bmatrix}$$

$$Mach_{dev}^{co} = [0.03\ 0.04]$$

$$CAS_{dev}^{co} = [12\ 16]\ knots$$

$$Mach_{big\_dev}^{co} = [0.04\ 0.05]$$

$$CAS_{big\_dev}^{co} = [16\ 20]\ knots$$

The following pseudo code updates the cruise Mach and descent CAS for this mutator.

If |ΔT|>Dev_TD_Both then $$Mach\_Inc = Mach_{big\_dev}^{co}$$

$$CAS\_Inc = CAS_{big\_dev}^{co}$$

Else $$Mach\_Inc = Mach_{dev}^{co}$$

$$CAS\_Inc = CAS_{dev}^{co}$$

Select Ω randomly as 1 or −1.
If Selection=Mach_Only $$M'_{cruise} = M_{cruise} + \Omega * Mach\_Inc(ind_{Mach})$$

Else if Selection=CAS_Only $$CAS_{descent} = CAS_{descent} + \Omega * CAS\_Inc(ind_{CAS})$$

Else if Selection=Both $$M'_{cruise} = M_{cruise} + \Omega * Mach\_Inc(ind_{Mach})$$

Select $\Omega_1$ randomly as 1 or −1.

$$CAS_{descent} = CAS_{descent} + \Omega_1 * CAS\_Inc(ind_{CAS})$$

If $M'_{cruise} > M_{max}$, then $M'_{cruise} = M_{max}$
Else if $M_{cruise} < M_{min}$, then $M'_{cruise} = M_{min}$
If $CAS'_{descent} > CAS_{max}$, then $CAS'_{descent} = CAS_{max}$
If $CAS'_{descent} < CAS_{min}$, then $CAS'_{descent} = CAS_{min}$ After the mutation, the systems herein may re-compute the speed profile of the select path candidate with the updated cruise Mach and descent CAS by using the E* forward sweep method discussed below.

Flight Path Angle Mutator:

The Flight Path Angle mutator may adjust the flight path angle of a path segment during descent. Note that all path segments (or legs) associated with the selected flight path angle are adjusted by this mutator and may be re-computed after mutation.

$$i \in [1, n_\gamma]$$

$$\Delta\gamma = \beta * \alpha$$

$$\gamma'_i = \begin{Bmatrix} \gamma_i + \Delta\gamma, \gamma_{min} \le \gamma_i + \Delta\gamma \le \gamma_{max} \\ \gamma_{max}, \gamma_i + \Delta\gamma > \gamma_{max} \\ \gamma_{min}, \gamma_i + \Delta\gamma < \gamma_{min} \end{Bmatrix}$$

Where:

$n_\gamma$ is the number of flight path angles during descent for this path candidate;

$\gamma_i$ is the randomly selected flight path angle in degrees from the specified range;

β is randomly selected as 0.1 or −0.1;

α is randomly selected from the range of [1, 5]; and $\gamma'_i$ is the revised flight path angle after mutation in degrees.

When the speed brake penalty is greater than 0, β is reset as 0.1 to make the flight path angle of the path candidate shallower (Note that $\gamma_i$ is a negative value during descent). After the mutation, the geometric shape of the descent path may be re-computed with the revised $\gamma'_i$ by using Eq. (4). Then, system 100 may re-compute the speed profile of the select path candidate using the E* forward sweep method discussed below.

Figure 8:
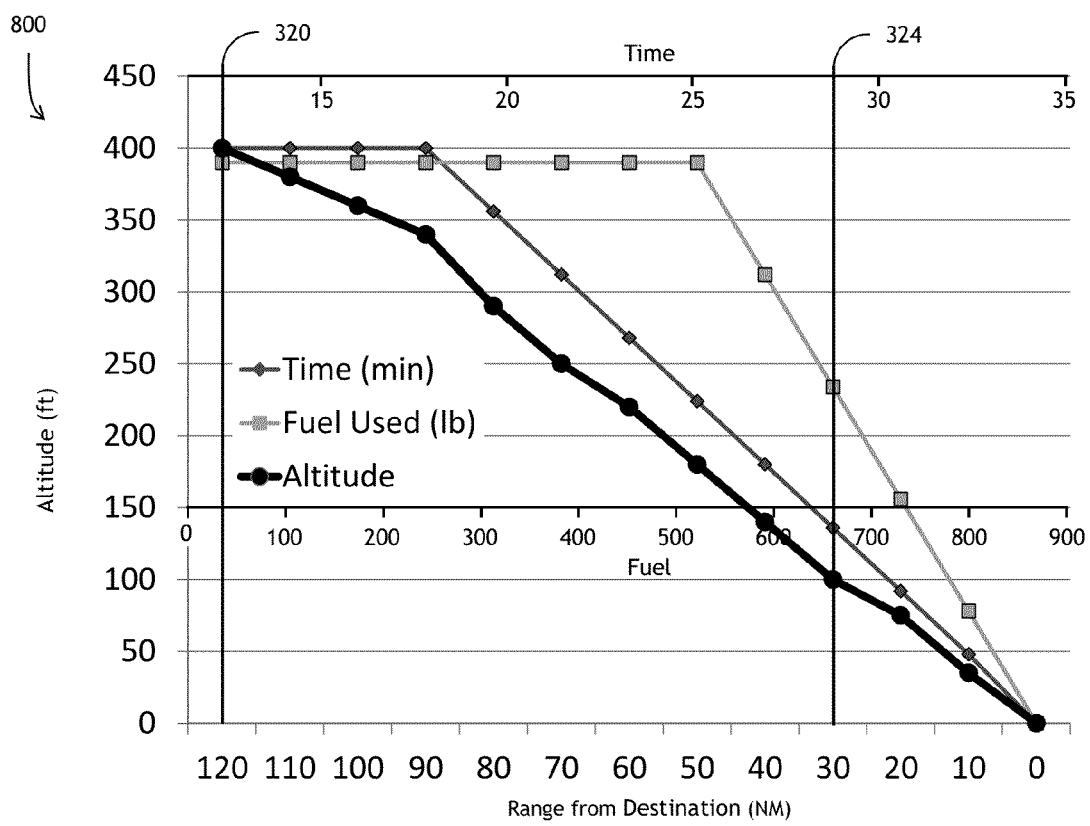
FIG. 8 is a graph of traversal time, fuel, and traversal distance for the GEO path in accordance with one embodiment of the present invention.

Referring to FIG. 8, a graph of traversal time, fuel, and traversal distance for the GEO path in accordance with one embodiment of the present invention is shown. Between TOD 520 and a statutory crossing restriction at BRINY 324, system 100 may optimize the OPD to minimize fuel required from TOD 520 to landing. As fuel costs may increase, OPD may become more widespread. As indicated in FIG. 8, system 100 may generate an OPD using 950 lbs of fuel and approximating 20 minutes elapsed in the approximately 120 NM between TOD 520 and landing. System 100 generation of an OPD may benefit users not only in fuel saved, but also in time between cruise and landing.

Figure 9:
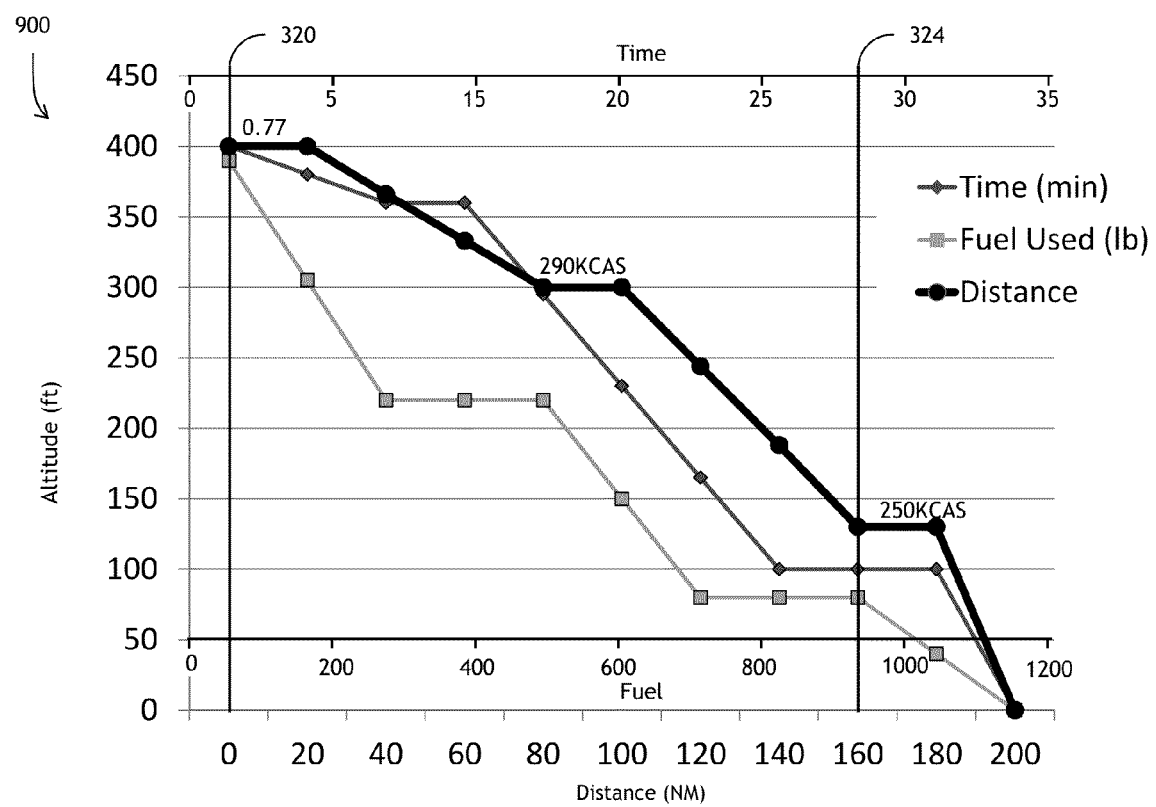
FIG. 9 is a graph of traversal time, fuel, and traversal distance for an inefficient stair step descent resolved by one embodiment of the present invention.

Referring to FIG. 9, a graph of traversal time, fuel, and traversal distance for an inefficient stair step descent resolved by one embodiment of the present invention is shown. A traditional stair step descent may involve frequent power settings greater than idle and inefficient decelerations to comply with RTA and statutory airspeed requirements. As shown in FIG. 9, a fuel used may approximate 1100 lbs as time from TOD 520 to landing may near 34 minutes.

E* Forward Sweep

After system 100 applies a DGA operator to the select path candidate G at a particular generation, system 100 may re-compute the 4D path profile of the select path candidate G at this particular generation by using the E* forward sweep method.

1. Set Integration Step: Determine the integration step for Eq. (1) based on at least one of the following two criteria. Note: the default integration step for each new path candidate is the coarse integration step.
   a. If |ETA-RTA| is smaller than the defined FINE_STEP_ENTRY threshold and the path candidate is currently set to the coarse integration step (e.g., 20 knots per 400 ft altitude change), then switch to the fine integration step (e.g., 5 knots per 100 ft altitude change);
   b. Else no change in the integration step.

2. Set Integration Starting Waypoint: Based on the applied DGA mutator, system 100 may select one of the following two procedures:
   a. If the flight path angle mutator is called by DGA, reconstruct the 3D descent path with the revised flight path angles by using Eq. (4), while maintaining its speed profile. The starting waypoint for trajectory integration is set at the current aircraft location.

b. If either the descent speed mutator or speed cross-over mutator is called by DGA, the starting waypoint for trajectory integration is set at the current aircraft location.

3. Propagate 4D Path: Propagate the 4D path forward from the starting waypoint for trajectory integration determined in Step 2. The propagation stops at the final waypoint on the descent path (may need to propagate through multiple legs). System 100 may use the following methods to perform the trajectory integration:

a. If the leg is a geographical leg (i.e., a leg with a constant flight path angle) with a constant speed, determine the required thrust and spoiler/speed brake force at each integration step to fly the specified flight path angle and speed.

b. If the leg is a geographical leg with a constant deceleration, propagate down the deceleration leg using the method discussed below.

4. Save Feasibility Status: If either the path candidate is infeasible or the fine integration step is used, save the feasibility status of the path candidate and exit this E* forward sweep method. However, if the path candidate is feasible and the coarse integration step was used, then a. Change the integration step size to be the fine integration step with the starting waypoint for trajectory set to the TOD 520 and then b. Go back to Step 3 to re-compute the speed profile of this path candidate. The cruise portion of the path candidate may re-use the result determined with the coarse integration since the difference between fine integration and coarse integration for the cruise segment is relatively small.

Deceleration Segment Adjustment

System 100 may determine the deceleration step (i.e., $\delta V/\delta h$) that results in feasible flight path angles along the entire specified deceleration segment is determined by looping from the highest to the minimum allowable deceleration step and exiting the loop when the feasible deceleration step is found. The rational for this speed adjustment, the detailed algorithm and the pseudo code may be detailed as follows.

First, compute $\Delta V$ as the speed difference between the beginning and ending waypoints of the deceleration segment.

$$\Delta V = V_b - V_e \quad (7)$$

Where $V_b$ is the CAS at the beginning waypoint of the deceleration leg and $V_e$ is the CAS at the ending waypoint of the deceleration leg. Then, loop from the highest allowable deceleration step to the minimum allowable deceleration step and exit the loop when the desired deceleration step is found. Determine an estimated altitude for the beginning waypoint of the deceleration leg for a specific $\delta V$ step, as follows.

$$N_i = \left(\frac{\Delta V}{\delta V_i}\right), i = n_s, \ldots, 1 \quad (8)$$

$$\Delta h_i = n_i * \delta h$$

$$H_i^b = H^e + \Delta h_i$$

Where:

$\delta V_i$ is the speed change per altitude change in the $i^{th}$ loop (e.g., $\delta V_i = 5$ knots for the deceleration step of 5 knots change per 100 ft integration step);

$\delta h$ is the specified altitude change (e.g., 100 ft or 400 ft) per integration step;

$n_s$ is the number of available $\delta V_i$ choices (e.g., $n_s=5$ if $\delta V_i$ may be selected from 5 knots to 1 knot change per altitude step with decrement by 1 knot);

$\Delta h_i$ is the altitude difference between the beginning waypoint and ending waypoint of the deceleration leg in the ith loop;

$H^e$ is the altitude of the ending waypoint of the deceleration leg;

$H_i^b$ is the estimated altitude of the beginning waypoint of the deceleration leg in the ith loop.

With $H_i^b$ and $\delta V_i$ determined in Eq. (8), propagate down the deceleration leg from the estimated beginning waypoint with the specified $\delta V_i/\delta h$, and check the feasibility of the flight path angle. If the flight path angle is infeasible during the propagation, set $i=i-1$ and use Eq. (8) to re-compute $H_i^b$. System 100 may repeat this process until it reaches the minimum allowable deceleration step or it finds a deceleration step that results in feasible flight path angles along the entire specified deceleration segment.

Processing Steps

The reference path serves as the seed path to generate the initial population of 10 path candidates (i.e., chromosomes) by using the genetic operators. A uniform probability is used to select each genetic operator. The reference path is one of these 10 path candidates in the initial population, $P_0$. So, only 9 additional new path candidates are generated from the seed path to populate $P_0$. The reference path is kept in the population for each generation. The processing steps are summarized below.

1. Determine the exit criteria threshold based on path cost criteria.

2. Use the reference path as the seed path to generate the initial population $P_0$ with a total of 10 path candidates.

3. Evaluate the fitness value of each path candidate in $P_0$ and sort them based on their fitness values.

4. If the exit condition is not met, go to Step 5. If the exit condition is met, the path candidate with the best fitness value is selected to generate the final descent path and exit the loop. Exit conditions are (a) The number of regeneration is equal to 10 or (b) At least one feasible path for three consecutive generations or (c) 3 feasible paths at the current generation exist and the differences between the average of the top 3 path candidates and any of these 3 top path candidates are all smaller than the exit criteria threshold determined in step 1.

5. Select the 5 best path candidates based on their fitness values to generate another 5 offspring path candidates. In addition, select another 2 path candidates with the uniform distribution from the remaining 5 candidates (i.e., from the 6th chromosome to the 10th chromosome) to generate additional 2 offspring path candidates. Note that one genetic operator is applied to each parent path to generate an offspring path.

6. Evaluate the fitness value for each offspring path with the E* forward sweep.

7. Add these new offspring paths into $P_0$ and sort $P_0$ based on the fitness value. So, $P_0$ now has a total of 17 path candidates.

8. Select the best 10 path candidates from $P_0$ and move these selected path candidates to form the next population $P_1$. If the reference path is not selected for the next population, replace the last select chromosome (i.e., the 10th path candidate) with the reference path in $P_1$. Go to Step 4.

If no feasible paths may be found, system 100 may alert the pilots via a warning message and the path candidate with the highest fitness value may be presented to pilots.

Time Control of the Predictable RTA-Compliant 4D Trajectory

Figure 10:
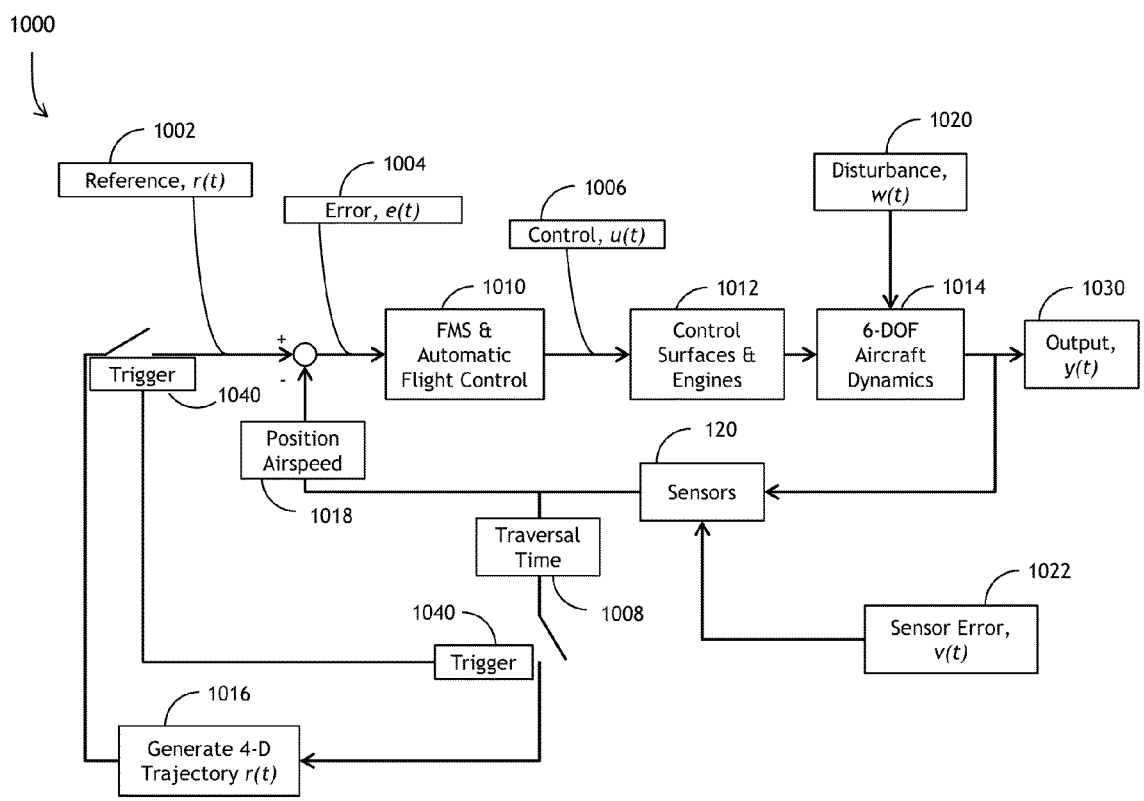
FIG. 10 is a diagram of an exemplary feedback time control in accordance with one embodiment of the inventive concepts disclosed.

Referring to FIG. 10, a diagram of an exemplary feedback time control in accordance with one embodiment of the inventive concepts disclosed is shown. Feedback time control 1000 employed by system 100 may enable system 100 initial reference path as well as a periodic replan of the reference path should some uncertainty be introduced after execution of an initial reference path. Time Control components may comprise FMS 110 and automatic flight control 1010; control surfaces and engines 1012; 6-Direction of Flight (DOF) aircraft dynamics 1014; sensors 120; and generation module for the 4-D trajectory 1016. Inputs to time control 1000 may include a disturbance (w)t 1020 and sensor error v(t) 1022 while outputs may include output y(t) 1030. Trigger 1040 may operate to begin the replan process of the feedback time control 1000.

Disturbance 1020 may include a plurality of factors which may change the compliance of the reference path and speed with respect to the assigned RTA. For example, an updated weather information including winds difference than forecast may act as a disturbance 1020 to initiate trigger 1040.

Due to the uncertainty of weather information 164 including wind and temperature profile data used for planning the predictable RTA-compliant 4D trajectory, system 100 may require subsequent replans after initial planning to ensure the aircraft 450 arrives at the metering waypoint within the required time threshold of RTA. If no replans are performed, an undesirable RTA error may result.

Feedback time control 1000 operation may begin with closing of trigger 1040 due to one of a disturbance 1020, a sensor error 1022, and a system 100 generation of the trigger signal. to begin the replan process. Process 1000 may compare reference path 1002 with current position and airspeed 1018 to determine an error 1004. FMS and automatic flight control 1010 may process the error 1004 and send a control input 1006 to control surfaces and engines 1012. 6-DOF aircraft dynamics 1014 may receive an indication of the disturbance 1020 and transmit the output signal 1030. Sensors 120 may operate to indicate current position and airspeed 1018. Traversal time 1008 may operate as one input to generation module 1016 to determine a replanned reference path.

System 100 may trigger 1040 a replan when the time difference between the predicted and actual arrival times at a given location on the flight path is greater than a specified time threshold. Also, system 100 may trigger 1040 a replan when a new RTA, wind profile, or temperature profile is received as a disturbance 1020.

Figure 11:
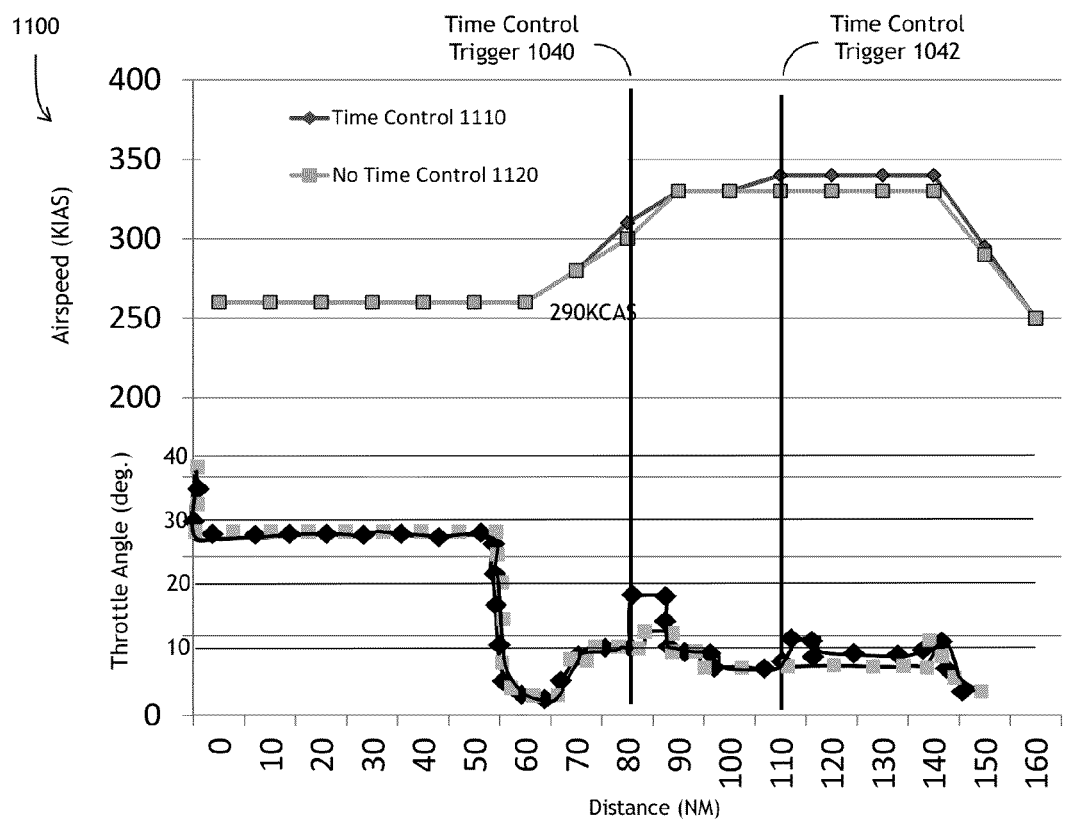
FIG. 11 is a graph of airspeed and throttle angle exemplary of a time control descent and a no time control descent in accordance with one embodiment of the inventive concepts disclosed.

Referring to FIG. 11, a graph of airspeed and throttle angle exemplary of a time control descent and a no time control descent in accordance with one embodiment of the inventive concepts disclosed is shown. Comparing curves representing a no time control 1120 operation with a time control 1110 operation, exemplary results may be indicated at a first trigger event 1040 and a second trigger event 1042. With a first trigger event 1040 near 80 NM, system 100 time control operation 1000 may increase airspeed via an associated throttle angle change to compensate for the decreased performance. Similarly, at the 110 NM mark, system 100 may adjust for a time control trigger 1042 resulting from a disturbance 1020 or other change in performance via a throttle angle change and associated airspeed increase.

For example, after TOD 520 as the aircraft 450 is on the reference path, weather information 164 may receive an update 174 indicating headwinds are stronger than forecast at 15,000 MSL. For example, the planned winds at 15,000 MSL may have been 090 degrees at 60 knots while actual winds are 090 degrees at 80 knots. In order to comply with the RTA, system 100 may increase aircraft 450 performance with an increase in airspeed via an increase in power (throttle angle).

Exemplary Predictable RTA-Compliant OPDs

In one embodiment of the present invention, aircraft performance data for a notional twin-engine regional jet may be modeled for system 100 evaluation. System 100 may employ variables similar to those shown and described below:

a. Cruise altitude is 40,000 ft (e.g., RAINS 320);
b. Airport speed restriction altitude and speed limit: 10,000 ft and 250 KCAS (e.g., BRINY 324);
c. Final altitude and speed constraint at the end of descent: 3000 ft and 250 KCAS (e.g., CEPIN 330);
d. The RTA constraint is imposed on the final waypoint (e.g., CEPIN 330);
e. Ground track distance from the initial aircraft cruise position to the final waypoint at 3000 ft is 200 nm;
f. Standard atmospheric model with no temperature deviations and no wind;
g. Maximum and minimum flight path angles during descent are −2 deg. and −6 deg., respectively;
h. Maximum speeds for the OPD planning are 0.81 for the cruise Mach and 320 knots for the descent speed;
i. Maximum speed reduction in the deceleration leg is 5 knots per 100 ft altitude change;
j. Aircraft initial weight is 105,000 lbs; and
k. Wing reference area is 1208.88 $ft^2$.

System 100 may model multiple types and methods to construct a predictable, RTA-compliant 4D path for the same scenario to evaluate fuel burn results.

Geo Descent Path:

System 100 may apply adequate thrust (e.g., above idle thrust) during descent to maintain the required flight path angles and speed profiles. The number of flight path angles during descent may equal the number of descent speed types. Often, this number may be two to comply with the goal of a constant Mach descent 552 followed by a constant CAS descent 554.

Stair-Step Descent Path:

As indicated in FIG. 9, at least two inefficient level segments exist during descent. The descent path is defined by constant flight path angles.

Geo Descent Path Method

FIG. 5 shows the above flight parameters from TOD 520 to the final waypoint system 100 may generate for the predictable RTA-compliant OPD path with the Geo Descent Path method. FIG. 7 shows the speed parameters for this scenario. FIG. 8 shows traversal time, accumulated fuel consumption and traversal distance with the Geo Descent Path method.

Fuel Savings Comparison

By comparing the fuel burn results in FIG. 8 and FIG. 9, the fuel savings of the Geo Descent Path method relative to the Stair-step Descent method may approximate 216 lbs. (31.8 gallons). Over time, this number may prove beneficial to a large operation.

Feasible RTA Window at the 95% Confidence Level

Upon receiving an RTA constraint from air traffic controllers, the pilot determines whether the received RTA is feasible (i.e., achievable) with a 95% confidence level, given the current aircraft states, aircraft performance limits, temperature deviations and wind conditions. Therefore, system 100 may compute a feasible RTA window at a 95% probability level to enable pilots to accept or reject the received RTA.

As used herein, the "RTA window" may include a statutory requirement wherein aircraft accepting an RTA clearance must arrive at the metering waypoint within plus or minus a specific window of time. For example, one RTA window may include a +/−six second window. In order to comply with the RTA, the aircraft must arrive at the metering waypoint within six seconds either side of the RTA. For example, an RTA may be assigned as 15:30:00. An aircraft will be in compliance with the assigned RTA if the aircraft passes the metering waypoint at 15:30:06 or at 15:29:54. This feasible RTA window indicates the earliest and latest arrival times at the metering waypoint with a 95% probability level that may be achieved by the aircraft, while complying with path constraints. If the received RTA is within the feasible RTA window, pilots may then accept the RTA. If the RTA is outside the feasible RTA window, pilots may notify air traffic controllers of the infeasibility.

Figure 12:
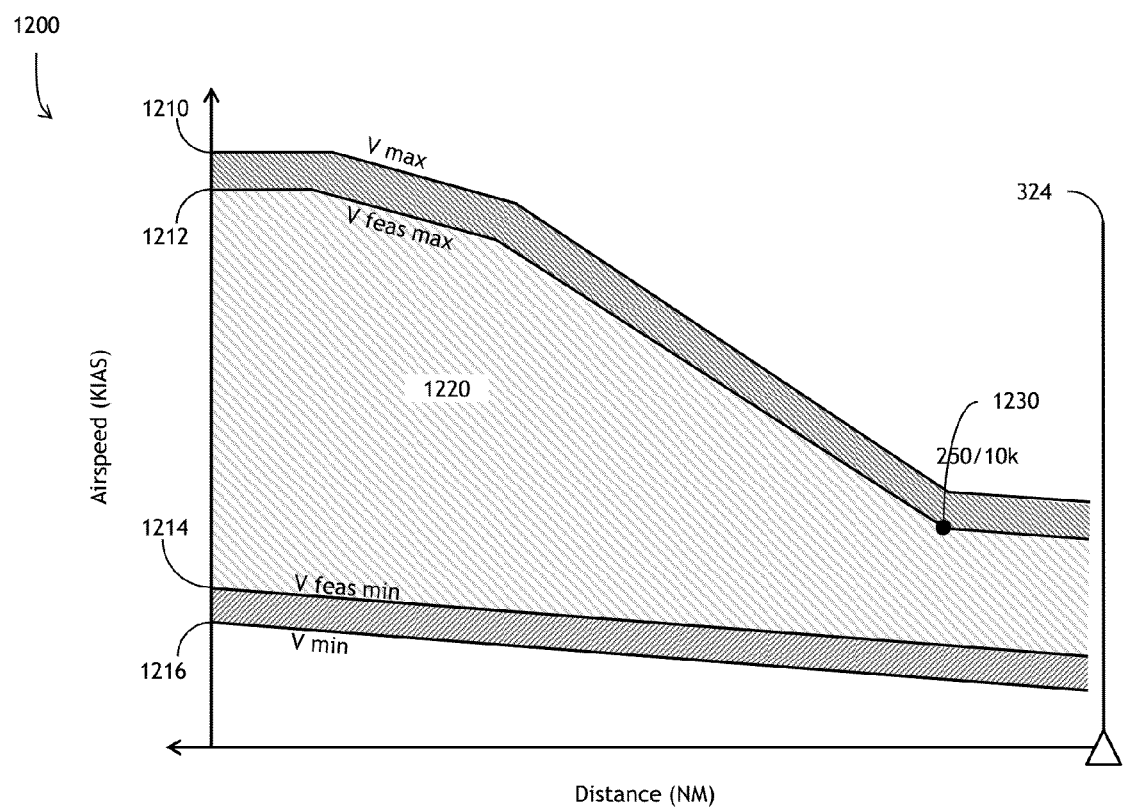
FIG. 12 is a graph of a feasible RTA window at 95% confidence level in accordance with one embodiment of the present invention.

Referring to FIG. 12, a graph of a feasible RTA window at 95% confidence level in accordance with one embodiment of the present invention is shown. Feasible speed range 1220 may include a minimum feasible speed 1214 which may enable aircraft 450 to arrive within the RTA window and a maximum feasible speed 1212 which also allows aircraft 450 to arrive within the RTA window. As range to the metering waypoint 324 decreases, the available airspeed range for the aircraft 450 also decreases.

Also indicated in FIG. 12 are maximum 1210 and minimum 1216 aircraft limits indicating a buffer may be applied between a structural limit and the airspeed required to reach the RTA metering waypoint 324. A statutory requirement 1230 may indicated a statutory maximum speed (here, 250 knots maximum at 10,000 ft MSL).

Figure 13:
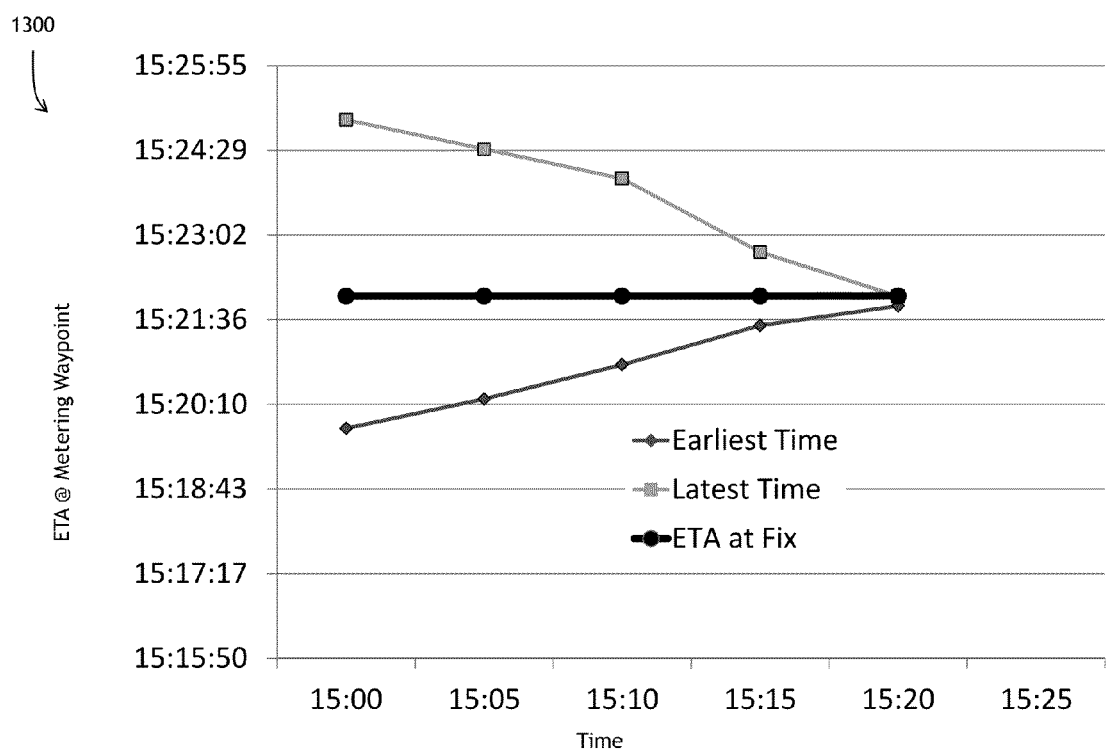
FIG. 13 is a graph of nominal performance of a feasible RTA window in accordance with one embodiment of the present invention.

Referring to FIG. 13, a graph of nominal performance of a feasible RTA window in accordance with one embodiment of the present invention is shown. As above, available time to meet the assigned RTA window decreases as the time approaches the assigned RTA. At time 15:00, with an assigned RTA of 15:20, the aircraft may be able to arrive at the metering waypoint 324 at 15:19:45 at the earliest and 15:24:55 at the latest. However at time 15:10 the available window of arrival may decrease to any time between 15:20:55 and 15:24:00.

System 100 may determine a feasible RTA window by searching for the maximum and minimum feasible airspeeds that may be achieved by the aircraft, given the current aircraft states, aircraft performance limits, temperature deviations and wind conditions.

System 100 may employ the E* Forward Sweep described above to determine whether the estimated speeds are feasible (i.e., comply with all constraints). There are at least two cases to consider when running the E* Forward Sweep to determine a feasible RTA window.

1. Current aircraft position is before the TOD 520 (i.e., during cruise) when the determination of the RTA window is triggered
2. Current aircraft position is after the TOD 520 (i.e., during descent) when the determination of the RTA window is triggered.

There are several factors that may trigger a determination of a new feasible RTA window, such as new updates of wind and temperature profile data or a new RTA is received from ATC.

For the first case, system 100 may employ E* Forward Sweep to perform the backward and forward sweep integration with the new estimated speeds to attempt to generate a new feasible flight path (and possibly a new TOD 520). The second case may use forward sweep integration since the aircraft has already passed the TOD 520.

System 100 may begin with an iteration of the feasible speed search from the maximum or minimum airspeeds of the flight envelope. The E* Forward Sweep determines the feasibility of each new estimated speed. When the estimated speed is feasible, the ETA of the new flight path is stored to capture the RTA window. For infeasible cases, system 100 may modify the estimated speed. System 100 may adjust the estimated speeds by +2 knots for the latest window and −2 knots for the earliest window until the speed is feasible or you have exited the speed range. The speed range is created based on the flight envelope of the aircraft and path constraints.

The first feasible flight path for each run may indicate the earliest or latest estimated time of arrival at the metering waypoint since the iteration of the feasible speed search starts from the maximum or minimum airspeed of the flight envelope.

System 100 may further determine a feasible RTA window design including: Ground Speed with the 95% Bound and Modified Breadth-First-Search.

Ground Speed with the 95% Bound

To compute the ETA at the metering waypoint, system 100 may convert the feasible airspeed into ground speed by compensating for the current wind. System 100 may employ well known statistical distribution techniques of the wind speed error as a Gaussian distribution. Thus, the 95% bound of the ground speed may be computed as follows.

$$\vec{V}_{g,95} = \vec{V}_T + \vec{V}_W + \vec{M}_{werr} \pm 1.66 \vec{\sigma}_{werr} \quad (9)$$

Where $\vec{V}_{g,95}$ is the 95% bound of the ground velocity;

$\vec{V}_T$ is the true air velocity;

$\vec{V}_W$ is the wind velocity;

$\vec{M}_{werr}$ is the mean of the wind velocity error;

$\vec{\sigma}_{werr}$ is the sigma value of the wind velocity error; and 1.66 is the scale factor to yield the 5% error probability for one Gaussian tail.

The use of a positive or negative sign with $\vec{\sigma}_{werr}$ in Eq. (9) is based on whether the earliest arrival time or the latest arrival time is being computed. For the case of determining the earliest arrival time, the sign selected for $\vec{\sigma}_{werr}$ may yield a smaller magnitude of $\vec{V}_{g,95}$. Therefore, aircraft 450 is able to fly at the fastest feasible airspeed to reach the metering waypoint with arrival time earlier than the RTA at the 95% probability level. In other words, if the received RTA is assigned at the earliest arrival time, aircraft 450 is able to comply with this RTA for the 95% of the wind error.

Similarly, for the case of determining the latest arrival time, the sign selected for $\vec{\sigma}_{werr}$ may yield a greater magnitude of $\vec{V}_{g,95}$. Therefore, aircraft is able to fly at the slowest feasible airspeed to reach the metering waypoint with arrival time later than the RTA at the 95% probability level.

Figure 14:
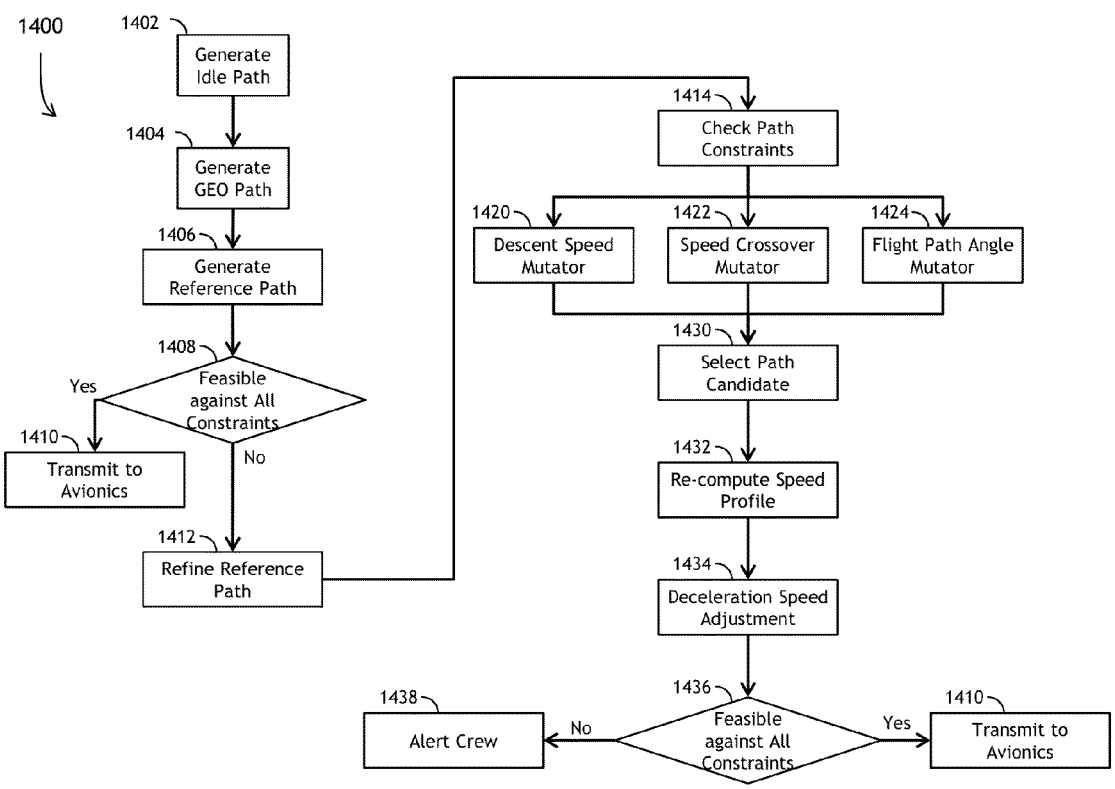
FIG. 14 is a flow diagram of an exemplary method for generating a predictable and RTA compliant OPD in accordance with one embodiment of the present invention.

Referring to FIG. 14, a flow diagram of an exemplary method for generating a predictable and RTA compliant OPD in accordance with one embodiment of the present invention is shown. System 100 may employ method 1400 to determine a feasible speed for the predictable and RTA compliant OPD. Method 1400 may begin at steps 1402 and 1404 with generating an idle path 1402 and a geo path 1404, and, at step 1406 with generating a reference path 1406 based on the idle and geo path data. A query at step 1408 may ask if the reference path is feasible against all constraints where a yes answer will transmit to avionics 1410 and a no answer will refine the reference path 1412. Step 1414 may check at least one path constraint while steps 1420, 1422, 1424 apply at least one mutator to the reference path. Step 1430 may select a path candidate and step 1432 may re-compute the speed profile to comply with the path candidate and the applied constraints. Step 1434 may apply the deceleration speed adjustment. A second query at step 1436 may ask again if the path candidate is feasible against all constraints where a yes answer will transmit to avionics and a no answer may alert the crew 1438 of the infeasibility of the speed.

Figures 15A, 15B:
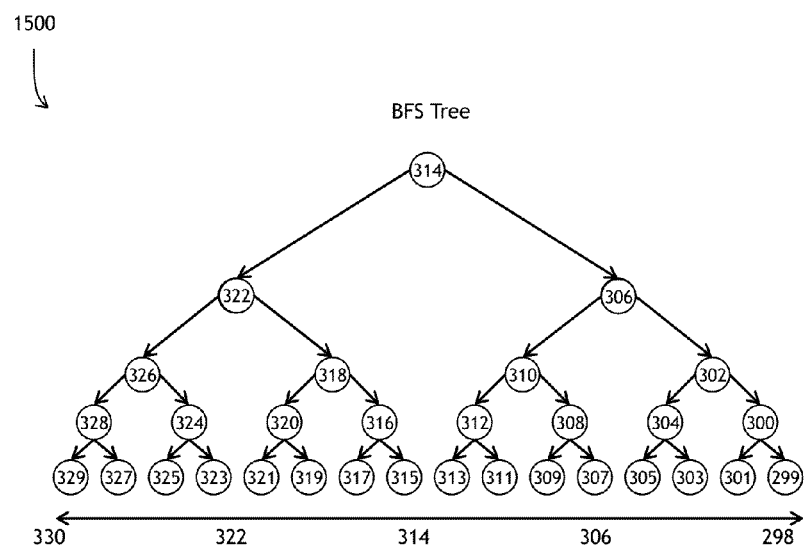
FIGS. 15A and 15B are diagrams of an exemplary Breadth-First-Search tree and Q array in accordance with one embodiment of the inventive concepts herein.

Referring to FIGS. 15A and 15B, diagrams of an exemplary Breadth-First-Search tree and Q array in accordance with one embodiment of the inventive concepts herein are shown. FIG. 15A represents an exemplary Breadth First Search (BFS) tree while FIG. 15B represents a BFS Q array indicative of search profiles employed by system 100.

Modified Breadth-First-Search

To determine the feasible RTA window, system 100 may start the search of feasible airspeeds from the maximum and minimum airspeeds that are within the flight envelope and flight constraints. System 100 may again employ the E* Forward Sweep methods to determine the flight path generated with the estimated airspeed as either feasible or infeasible. When the flight path is determined as infeasible, the estimated airspeed is adjusted and the E* Forward Sweep is evaluated again with this adjusted airspeed. The estimated airspeed is adjusted by using a computationally efficient modified BFS algorithm coupled with a binary search method detailed below.

Finding a Feasible Airspeed with the Modified BFS Tree

System 100 may employ the computationally efficient modified BFS algorithm similar to a binary search method to quickly locate a desired value within a range of sorted values. An array may stores a range of sorted values and the binary search algorithm continually checks the half-space values of the array for the desired value. There exist three possibilities with each half-space/midpoint check:

a. The desired value is smaller than the midpoint value.
    b. The desired value is greater than the midpoint value.
    c. The desired value equals the midpoint value.

For the first case, the lower half of the array becomes the new search range. For the second case, the upper half of the array becomes the new search range. When the third case is reached, the desired value has been located and the location of the desired value in the array is returned to the calling function. System 100 may repeat this process until the desired value is found. A typical binary search method determines the next half-space range to check as the half-space range encompassing the desired value.

To determine the feasible RTA window, the maximum and minimum feasible airspeeds need to be found from within a speed range that complies with the flight envelope and flight constraints. Thus, two binary searches may be required with each search to locate the maximum or minimum feasible airspeed. During search, system 100 evaluates each attempted airspeed with the energy equation and returns a Boolean result-true for a feasible airspeed, and, false for an infeasible airspeed. Since the desired value (i.e., the maximum or minimum feasible airspeed) is unknown, system 100 may not start the binary search method until it finds a feasible airspeed. After system 100 determines a feasible airspeed, it may properly employ the binary search method to determine what the next half-space range is.

To determine a feasible airspeed, system 100 may create a Breadth First Search tree to systematically search each half interval. Once a feasible speed is found, system 100 may perform a typical binary search. The following subsections describe one process for finding a feasible airspeed by checking each half interval along the entire search range. When no feasible airspeed can be found, system 100 may return an invalid speed value. System 100 calling functions periodically check for this invalid value.

Check Extreme Values

System 100 may first check the extreme values of the airspeed range for feasibility. In most cases, one of the extreme speeds is likely to be feasible. The pseudo-code below outlines one procedure for checking the extreme values.

1. For the determination of the earliest RTA, system 100 may:
    a. Check the maximum airspeed. If the maximum airspeed can generate a feasible path solution, then exit the search and use the maximum airspeed to compute the earliest arrival time. Otherwise continue to Step b.
    b. Check the minimum airspeed. If the minimum airspeed can generate a feasible path solution, perform the typical binary search to find a feasible maximum speed within the range of [minimum speed+1, maximum speed−1] since minimum speed is feasible and maximum speed is infeasible. Otherwise, a BFS tree described herein below may be employed to find a feasible airspeed.
2. For the determination of the latest RTA, system 100 may:
    a. Check the minimum speed. If the minimum speed can generate a feasible path solution, then exit the search and use the minimum airspeed to compute the latest arrival time. Otherwise continue to step b.
    b. Check the maximum speed. If the maximum speed can generate a feasible path solution, perform the typical binary search to find a feasible minimum speed within the range of [minimum speed+1, maximum speed−1] since maximum speed is feasible and minimum speed is infeasible. Otherwise, system 100 may employ the BFS tree to find a feasible airspeed.

Breadth-First-Search

After the maximum and minimum values of the airspeed range have been tested and both of them are infeasible, system 100 may start the search of a feasible airspeed by first creating a BFS tree with the root node initialized as the average airspeed of the minimum and maximum speeds. This root node becomes the next searched point. The following pseudo-code outlines one procedure system 100 may employ for checking the speed values and maintaining the BFS tree structure.

1. Add the average airspeed of the minimum and maximum airspeed to the array Q. This airspeed is the root node of the BFS tree Q. Here 314 knots may be an exemplary root node of the BFS tree.

2. Initialize the feasible_speed variable as an invalid value of −1 and assign the airspeed interval as [minimum airspeed+1, maximum airspeed−1] in knots since both minimum and maximum airspeeds are infeasible.

3. Assign the pointer Q_ptr to point to the first element in the Q array.

4. Get the first positive airspeed from Q by increasing Q_ptr until a valid airspeed element that is greater than zero is located in Q. When Q_ptr exceeds the number of elements in Q, exit this BFS search and return the speed interval and the feasible_speed which may have an invalid value.

5. Check whether the airspeed indicated by Q_ptr can generate a feasible path. If a feasible path can be generated, assign the feasible_speed variable with this airspeed and go to step 9. If not, continue to the next step.

6. Set the half interval for the next layer of the BFS tree as the half of the current airspeed interval.

7. If the half interval of the next layer is greater than 0.5 knots, determine the left child and right child for the next node in Q as follows. Otherwise, go back to step 4 and continue the search.
   a. When finding the maximum feasible airspeed, the left child is the current speed+half interval. The right child is the current speed−half interval.
   b. When finding the minimum feasible airspeed, the left child is the current speed−half interval. The right child is the current speed+half interval.
   c. When the half interval is smaller than 1.0, but greater than 0.5, make sure the speeds added to the Q are unique. If the speed is a duplicate, then add an invalid entry to the Q to maintain the proper tree structure.

Note: The airspeeds are positive integer values in knots so that the half interval must be greater than 0.5.

8. Add the left child first then the right child nodes to Q. Increase Q_ptr by one and then go to step 4.

9. System 100 has found a feasible speed. Now system 100 may determine the search interval to be returned to the calling function as follows.
   a. Assume the BFS tree is stored in an array with index starting at 1 and children nodes are stored into Q according to Step 7, system 100 may check the airspeeds located at odd indices of the Q array. If Q_ptr is located at an odd index of the Q array, assign this odd index location to child_speed_location. If not, locate the first odd indexed ancestor of the node by doing the left bit shifting of the indexed value of the node until (index AND 1) returns true and assign that specific index value to child_speed_location.
   b. When searching for the maximum speed, determine the speed interval as follows.
      i. If child_speed_location>1, find the array index of the parent to the child at the index location of child_speed_location. Assign the index of the parent node to temp_speed_location. Then, max_speed=Q[temp_speed_location]. Otherwise, assign the max_speed to the maximum speed.
      ii. The final interval is [feasible speed+1, max_speed−1].
   c. When searching for the minimum speed, determine the speed interval as follows.
      i. If child_speed_location>1, find the array index of the parent to the child at the index location of child_speed_location. Assign the index of the parent node to temp_speed_location. Then, min_speed=Q[temp_speed_location]. Otherwise, assign the min_speed to the minimum speed.
      ii. The final interval is [min_speed+1, feasible speed−1].

10. Return the speed interval and the feasible speed to start the binary search method.

Examples with the Modified BFS Method

Again, referencing FIG. 15A, two examples may illustrate how system 100 may employ the modified BFS search to find a feasible airspeed from within the airspeed interval of [298, 330] knots for the case of determining the earliest RTA. System 100 may create the full BFS tree Q by assuming that a feasible airspeed cannot be found within the airspeed interval of [298, 330].

1. Since the maximum airspeed of 330 knots and the minimum airspeed of 298 knots were both infeasible, the search interval to start the BFS search is (298 330) kts.

2. Compute the average airspeed of the maximum and minimum airspeed as 314 kts (0.5*(330+298)). This average airspeed is assigned as the root node and the first element of the BFS tree Q. Then, set the Q_ptr to point to the first element of Q. The half interval of the BFS tree is 16 knots (0.5*(330−298)).

3. Determine whether the airspeed indicated by Q_ptr is feasible or not.
   a. For the first round Q_ptr is pointing to 314 kts. Assume it is not feasible for this example.
   b. For all future rounds, assume the airspeed indicated by Q_ptr is infeasible.
   c. When Q_ptr exceeds the number of elements in Q then exit the BFS tree building process.

4. Compute the half interval for the next layer of the BFS tree. If the new half interval is less than or equal to 0.5 knots, go to step 6.
   a. For the first round, the half interval of the next layer is 8 knots (0.5*(314−298)).

5. Create left and right children by adding the half space of the next layer for this location.
   a. For the first round, the left child is 314+8=322. Add 322 to Q first.
   b. Right child is 314−8=306. Add 306 to Q.

6. Increment Q_ptr by one and go to step 3.

Example 1

System 100 may assume the feasible airspeed occurs at the speed of 305 kts. To find the search interval for the binary search tree, system 100 may locate the first odd node of the tree starting at the feasible airspeed of 305 kts and evaluate the ancestors of this particular node.

1. Locate the element index in the Q array for 305 kts. This speed is located at Q(28) 1530. Since the index of 28 is an even value, continue to look for the odd-indexed ancestor.

2. In the BFS tree locate the parent for the node of 305 kts. The parent is 304 kts.

3. Locate the element index in Q array for 304 kts. This parent speed is located at Q(14) 1532. Since the index of 14 is still an even value, continue with the search.

4. In the BFS tree locate the parent for the node of 304 kts. The parent is 302 kts.

5. Locate the element index in Q array for 302 kts and it is located at Q(7) 1534. Since the index of 7 is an odd value, the parent of this node is the next closest maximum speed that has already been searched. The parent of 302 kts is 306 kts. So the search interval would be [305+1, 306−1] or [306, 305]. This would indicate that the minimum speed is greater than the maximum speed which is not possible. So, the airspeed of 305 knots is the maximum feasible speed.

Example 2

System 100 may assume the feasible speed occurs at the speed of 310 kts. To find the search interval for the binary search tree, system 100 may locate the first odd node of the tree starting at 310 kts and limiting the search to the ancestors of this node.

1. Locate the element index in the Q array for 310 knots. This speed is located at Q(6) 1540. Since 6 is even, continue the search.

2. In the BFS tree locate the parent for the node of 310 kts. The parent is 306 kts.

3. Locate the element index in the Q array for 306 knots. This speed is located at Q(3) 1542. Since 3 is an odd number, the parent of this node is the next closest maximum speed that has already been searched. The parent of 306 kts is 314 kts. Therefore the search interval would be [310+1, 314−1] or

[311, 313]. System 100 may exercise the binary search tree to find the solution in this interval.

Figure 16:
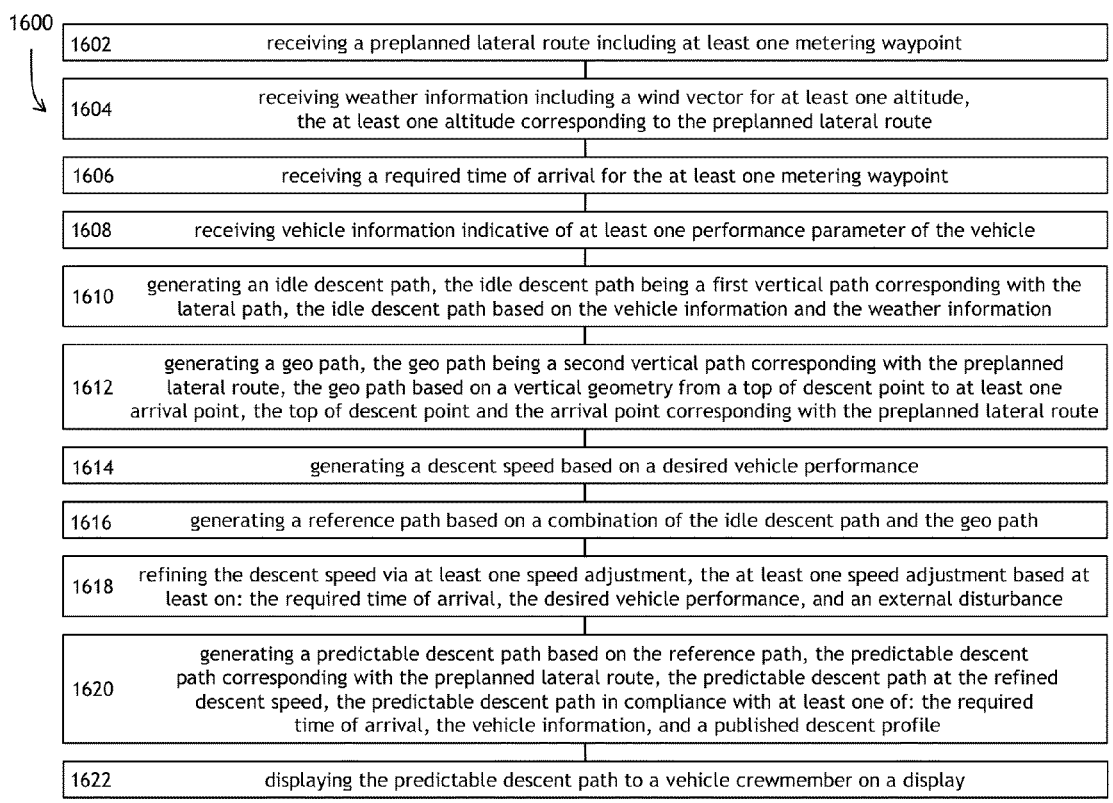
FIG. 16 is a flow diagram of a method for exemplary method for generating a predictable and RTA compliant OPD representative of one embodiment of the present invention.

Referring to FIG. 16, a flow diagram of a method for exemplary method for generating a predictable and RTA compliant OPD representative of one embodiment of the present invention is shown. Method 1600 may begin at step 1602, with receiving a preplanned lateral route including at least one metering waypoint, and, at step 1604, with receiving weather information including a wind vector for at least one altitude, the at least one altitude corresponding to the preplanned lateral route, and, at step 1606 with receiving a required time of arrival for the at least one metering waypoint, and, at step 1608 with receiving vehicle information indicative of at least one performance parameter of the vehicle, and, at step 1610 with generating an idle descent path, the idle descent path being a first vertical path corresponding with the lateral path, the idle descent path based on the vehicle information and the weather information, and, at step 1612 with generating a geo path, the geo path being a second vertical path corresponding with the preplanned lateral route, the geo path based on a vertical geometry from a top of descent point to at least one arrival point, the top of descent point and the arrival point corresponding with the preplanned lateral route.

Method 1600 may continue at step 1614 with generating a descent speed based on a desired vehicle performance, and, at step 1616 with generating a reference path based on a combination of the idle descent path and the geo path, and, at step 1618 with refining the descent speed via at least one speed adjustment, the at least one speed adjustment based at least on: the required time of arrival, the desired vehicle performance, and an external disturbance, and, at step 1620 with generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile, and method 1600 may conclude at step 1622 with displaying the predictable descent path to a vehicle crewmember on a display.

Skilled artisans will recognize embodiments of the present invention may be incorporated within the FMS of a plurality of vehicles. Some embodiments may be suited for incorporation within a large transport category aircraft and a small fighter/trainer jet. Additional embodiments may be suitable for incorporation within the FMS of a small lightweight aircraft and an unmanned aerial vehicle and/or within planning and operational software controlling such an unmanned aerial vehicle.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out various features of the present invention as applied to various embodiments, it will be understood that various omissions and substitutions and changes in the form and details of the system illustrated may be made by those skilled in the art, without departing from the intent and broad scope of the present invention. The foregoing description details certain embodiments of the present invention. It will be appreciated, however, that no matter how detailed the foregoing appears, the present invention may be embodied in other specific forms without departing from its spirit or broad scope. The described embodiments are to be considered in all respects only as illustrative and not restrictive, and the scope of the present invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Skilled artisans will recognize a positioning signal as described and used herein may be received from a plurality of positioning satellite vehicle types and on a plurality of frequencies. As used herein, a GNSS signal may include any positioning and timing signal received from any satellite vehicle and network. A non-exclusive list of currently available satellite positioning system may include a Global Positioning System (GPS), a Global Navigation Satellite System (GNSS), a Global Navigation Satellite System (GLONASS), a Galileo system, a Beidou system, a COMPASS system, an India Regional Satellite System (IRNSS), and a Quasi-Zenith Satellite System (QZSS).

Although a user may be shown/described/referenced herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for generating a predictable descent path for a vehicle, comprising:
   receiving a preplanned lateral route including at least one metering waypoint;
   receiving weather information including a wind vector for at least one altitude, the at least one altitude corresponding to the preplanned lateral route;
   receiving a required time of arrival for the at least one metering waypoint;
   receiving vehicle information indicative of at least one performance parameter of the vehicle;
   generating an idle descent path, the idle descent path being a first vertical path corresponding with the lateral path, the idle descent path based on the vehicle information and the weather information;
   generating a geo path, the geo path being a second vertical path corresponding with the preplanned lateral route, the geo path based on a vertical geometry from a top of descent point to at least one arrival point, the top of descent point and the arrival point corresponding with the preplanned lateral route;
   generating a descent speed based on a desired vehicle performance;
   generating a reference path based on a combination of the idle descent path and the geo path;
   refining the descent speed via at least one speed adjustment, the at least one speed adjustment based at least on: the required time of arrival, the desired vehicle performance, and an external disturbance;
   generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile; and
   displaying the predictable descent path to a vehicle crewmember on a display.

2. The method for generating a predictable descent path for a vehicle of claim 1, wherein the predictable descent path at the refined descent speed is accurate at the metering waypoint to within one of: 95% of the required time of arrival, and six seconds of the required time of arrival.

3. The method for generating a predictable descent path for a vehicle of claim 1, wherein the vehicle is one of: an aircraft, helicopter, a manned aerial vehicle, and an unmanned aerial vehicle.

4. The method for generating a predictable descent path for a vehicle of claim 1, wherein the preplanned lateral route includes at least one of a flight plan, a published procedure, a noise sensitive procedure, and a standard instrument procedure.

5. The method for generating a predictable descent path for a vehicle of claim 1, wherein the predictable descent path at the refined descent speed further comprises a predictable climb path at a refined climb speed.

6. The method for generating a predictable descent path for a vehicle of claim 1, wherein the weather information further comprises a plurality of wind vectors at a corresponding plurality of altitudes, the plurality of wind vectors updatable via a wireless signal.

7. The method for generating a predictable descent path for a vehicle of claim 1, wherein generating a reference path further comprises generating a second idle descent path and a second reference path after at least one of a disturbance and an update to the weather information.

8. The method for generating a predictable descent path for a vehicle of claim 1, wherein the vertical geometry from a top of descent point to at least one arrival point further comprises a vertical altitude and a lateral range.

9. The method for generating a predictable descent path for a vehicle of claim 1, wherein generating a descent speed further comprises at least one continuous speed descent and at least one continuous deceleration descent.

10. A system for generating a predictable descent path for a vehicle, comprising:
   a flight management system, the flight management system including a flight management computer operably coupled with at least a non-transitory memory, an input output, a display, a route information module, an aircraft information module, and an updatable weather information module;
   wherein the flight management computer is configured for:
      receiving a preplanned lateral route from the route information module, the preplanned lateral route including at least one metering waypoint;
      receiving weather information via the updatable weather information module, the weather information including a wind vector for at least one altitude, the at least one altitude corresponding to the preplanned lateral route;
      receiving a required time of arrival for the at least one metering waypoint;
      receiving aircraft information via the aircraft information module, the aircraft information indicative of at least one performance parameter of the aircraft;
      generating an idle descent path, the idle descent path a first vertical path corresponding with the lateral path, the idle descent path based on the aircraft information and the weather information;
      generating a geo path, the geo path being a second vertical path corresponding with the preplanned lateral route, the geo path based on a vertical geometry from a top of descent point to at least one arrival point, the top of descent point and the arrival point corresponding with the preplanned lateral route;
      generating a descent speed based on a desired aircraft performance;
      generating a reference path based on a combination of the idle descent path and the geo path;
      refining the descent speed via at least one speed adjustment, the at least one speed adjustment based at least on: the required time of arrival, the desired aircraft performance, and an external disturbance;
      generating a predictable descent path based on the reference path, the predictable descent path corresponding with the preplanned lateral route, the predictable descent path at the refined descent speed, the predictable descent path in compliance with at least one of: the required time of arrival, the aircraft information, and a published descent profile;

displaying the predictable descent path to a pilot on the display.

11. The system for generating a predictable descent path for a vehicle of claim 10, wherein the predictable descent path at the refined descent speed is accurate at the metering waypoint to within one of: 95% of the required time of arrival, and six seconds of the required time of arrival.

12. The system for generating a predictable descent path for a vehicle of claim 10, wherein the vehicle is one of: an aircraft, helicopter, a manned aerial vehicle, and an unmanned aerial vehicle.

13. The system for generating a predictable descent path for a vehicle of claim 10, wherein the preplanned lateral route includes at least one of a flight plan, a published procedure, a noise sensitive procedure, and a standard instrument procedure.

14. The system for generating a predictable descent path for a vehicle of claim 10, wherein the predictable descent path at the refined descent speed further comprises a predictable climb path at a refined climb speed.

15. The system for generating a predictable descent path for a vehicle of claim 10, wherein the weather information further comprises a plurality of wind vectors at a corresponding plurality of altitudes, the plurality of wind vectors updatable via a wireless signal.

16. The system for generating a predictable descent path for a vehicle of claim 10, wherein generating a reference path further comprises generating a second idle descent path and a second reference path after at least one of a disturbance and an update to the weather information.

17. The system for generating a predictable descent path for a vehicle of claim 10, wherein the vertical geometry from a top of descent point to at least one arrival point further comprises a vertical altitude and a lateral range.

18. The system for generating a predictable descent path for a vehicle of claim 10, wherein generating a descent speed further comprises at least one continuous speed descent and at least one continuous deceleration descent.

19. A system for generating a predictable descent path for an aircraft, comprising:
at least one computer device or processor onboard the aircraft;
a computer readable medium having non-transitory computer readable program code embodied therein for generating a predictable descent path for an aircraft, the computer readable program code comprising instructions which, when executed by the at least one computer device or processor, cause the at least one computer device or processor to perform and direct the steps of:
receiving a preplanned lateral route including at least one metering waypoint;
receiving weather information including a wind vector for at least one altitude, the at least one altitude corresponding to the preplanned lateral route;
receiving a required time of arrival for the at least one metering waypoint;
receiving vehicle information indicative of at least one performance parameter of the vehicle;
generating an idle descent path, the idle descent path a first vertical path corresponding with the lateral path, the idle descent path based on the vehicle information and the weather information;
generating a geo path, the geo path being a second vertical path corresponding with the preplanned lateral route, the geo path based on a vertical geometry from a top of descent point to at least one arrival point, the top of descent point and the arrival point corresponding with the preplanned lateral route;
generating a descent speed based on a desired vehicle performance;
generating a reference path based on a combination of the idle descent path and the geo path;
refining the descent speed via at least one speed adjustment, the at least one speed adjustment based at least on: the required time of arrival, the desired vehicle performance, and an external disturbance;
generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile.

20. A method for generating a predictable descent path for a vehicle, comprising:
means for receiving a preplanned lateral route including at least one metering waypoint;
means for receiving weather information including a wind vector for at least one altitude, the at least one altitude corresponding to the preplanned lateral route;
means for receiving a required time of arrival for the at least one metering waypoint;
means for receiving vehicle information indicative of at least one performance parameter of the vehicle;
means for generating an idle descent path, the idle descent path a first vertical path corresponding with the lateral path;
means for generating a geo path, the geo path being a second vertical path corresponding with the preplanned lateral route;
means for generating a descent speed, the descent speed based on a desired vehicle performance;
means for generating a reference path based on a combination of the idle descent path and the geo path;
means for refining the descent speed via at least one speed adjustment;
means for generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile.

21. A method for generating descent path for a vehicle predictable within 95% of a confidence level, comprising:
receiving a preplanned lateral route including at least one metering waypoint;
receiving weather information including a wind vector for at least one altitude, the at least one altitude corresponding to the preplanned lateral route;
receiving a required time of arrival for the at least one metering waypoint, the required time of arrival including a window of compliance;
receiving vehicle information indicative of at least one performance parameter of the vehicle;
generating an idle descent path, the idle descent path a first vertical path corresponding with the lateral path, the idle descent path based on the vehicle information and the weather information;

generating a geo path, the geo path being a second vertical path corresponding with the preplanned lateral route, the geo path based on a vertical geometry from a top of descent point to at least one arrival point, the top of descent point and the arrival point corresponding with the preplanned lateral route;

generating a feasible descent speed based on: a desired vehicle performance and the window of compliance;

generating a reference path based on a combination of the idle descent path and the geo path;

refining the feasible descent speed via at least one speed adjustment, the at least one speed adjustment based at least on: the required time of arrival, the desired vehicle performance, the window of compliance, and an external disturbance, the refined feasible speed accurate to within a 95% confidence level to meet the window of compliance;

generating a predictable descent path based on the reference path, the predictable descent path corresponding with the preplanned lateral route, the predictable descent path at the refined descent speed, the predictable descent path in compliance with at least one of: the required time of arrival, the vehicle information, and a published descent profile; and displaying the predictable descent path and the refined feasible speed to a vehicle crewmember on a display.

22. The method for generating descent path for a vehicle predictable within 95% of a confidence level of claim 21, wherein the window of compliance is plus and minus six seconds from the received required time of arrival.

23. The method for generating descent path for a vehicle predictable within 95% of a confidence level of claim 21, wherein the refined feasible speed is based at least on one of: a maximum feasible speed and a minimum feasible speed, the maximum feasible speed less than a maximum vehicle speed, the minimum feasible speed greater than a minimum vehicle speed.

* * * * *